United States Patent [19]
Jönsson

[11] Patent Number: 5,294,876
[45] Date of Patent: Mar. 15, 1994

[54] METHOD AND APPARATUS FOR CONTROLLING AN AC INDUCTION MOTOR BY INDIRECT MEASUREMENT OF THE AIR-GAP VOLTAGE

[76] Inventor: Ragnar Jönsson, Kyrkobacksvägen 5, S-271 95 Ystad, Sweden

[21] Appl. No.: 920,310
[22] PCT Filed: Aug. 2, 1991
[86] PCT No.: PCT/SE91/00086
 § 371 Date: Aug. 12, 1992
 § 102(e) Date: Aug. 12, 1992
[87] PCT Pub. No.: WO91/12656
 PCT Pub. Date: Aug. 22, 1991

[30] Foreign Application Priority Data
 Feb. 12, 1990 [SE] Sweden .................... 9000497

[51] Int. Cl.$^5$ ............................... H02P 5/40
[52] U.S. Cl. .................... 318/803; 318/809; 318/807
[58] Field of Search ............... 318/800, 803, 805, 807, 318/808, 809, 810

[56] References Cited

U.S. PATENT DOCUMENTS

| | | |
|---|---|---|
| 3,796,935 | 3/1974 | Blaschke .................... 318/810 |
| 4,282,473 | 8/1981 | Dreiseitl et al. . | |
| 4,447,787 | 5/1984 | Schwesig et al. ........... 318/808 |
| 4,626,761 | 12/1986 | Blaschke . | |
| 4,763,058 | 8/1988 | Heining et al. ............. 318/807 |
| 4,885,519 | 12/1989 | Vogelmann ................. 318/800 |
| 5,001,411 | 3/1991 | Heinle ........................ 318/805 |

FOREIGN PATENT DOCUMENTS

| | | |
|---|---|---|
| 8102076 | 7/1981 | World Int. Prop. O. . |
| 8807287 | 9/1988 | World Int. Prop. O. . |

*Primary Examiner*—William M. Shoop, Jr.
*Assistant Examiner*—John W. Cabeca
*Attorney, Agent, or Firm*—Ladas & Parry

[57] ABSTRACT

A control system for an AC induction motor, comprising a stator, a rotor, at least two stator windings and rotor windings. The control system comprises a first vector rotator for rotating control signals with a first angle ($\alpha$) for providing output signals connected to frequency inverters for providing drive signals to each stator winding of the motor, said first angle ($\alpha$) being the time integral of a rotation frequency (w). Moreover, the control system comprises a second vector rotator for counterrotating measured drive voltages and/or currents with a second angle ($-\alpha$) which is the inverse of said first angle ($\alpha$). The rotation frequency (w) is controlled in dependence of said counterrotated measured voltages and/or currents essentially for maintaining the amplitude of said magnetizing currents (Im) of each stator winding constant which is a necessary condition for obtaining Natural Field Orientation.

20 Claims, 14 Drawing Sheets 5,294,876

METHOD AND APPARATUS FOR CONTROLLING AN AC INDUCTION MOTOR BY INDIRECT MEASUREMENT OF THE AIR-GAP VOLTAGE

TECHNICAL FIELD

This invention relates to an improved method and apparatus for controlling an AC induction motor by indirect measurement of the air-gap voltage of the AC induction motor and using said air-gap voltage for generating an optimal modulation frequency for the conversion of control signals from field coordinates to drive signals in stator coordinates for the AC induction motor. The modulation frequency is generated so that the magnetizing current is constant, which is a necessary condition for obtaining Natural Field Orientation.

PRIOR ART

Many qualified systems for AC induction motor control are based on the concept "Field Orientation". This concept has been known for twenty years. Conventional field orientation requires measurement of the magnetic field. However, the magnetic field is difficult to measure.

Today there are systems for "Indirect Field Orientation". The field measurement has been replaced, for example, by methods which are based on measurement of the rotor frequency plus calculation of the slip frequency. Much research is still going on.

Swedish patent No. 8000118 (same as European Patent No. 0049241 "Method and apparatus for controlling an AC induction motor") discloses a control system which creates field orientation without field measurement, and is presently called "Natural Field Orientation". The motor contributes to the field orientation in a natural way, thanks to the inherent properties of all AC induction motors. Said system operates with voltage control, and requires a speed sensor on the motor shaft. The present invention is a development and an improvement of said system and eliminates the speed sensor. The present invention can be used with voltage as well as current control.

In all field oriented control systems, also in the system according to the present invention, the motor is controlled by a control vector in field coordinates. The externally generated control vector is converted from field coordinates to stator coordinates by a first vector rotator and connected to the motor via frequency inverters. An airgap voltage appears in the motor.

DISCLOSURE OF THE INVENTION

The airgap voltage has a central role in the AC induction motor. The present invention is based on indirect measurement of the airgap voltage. Then, the measured airgap voltage vector is transformed to field coordinates by a second vector rotator. An optimal rotation frequency is generated, proportional to the amplitude of the measured airgap voltage and both the vector rotators are controlled or rotated with this frequency, resulting in a constant ratio between the amplitude of the airgap voltage and the modulation frequency, thereby obtaining a constant amplitude of the magnetizing field current during all operating conditions. Quadrature between the field current and the rotor current in each phase is automatically obtained, thanks to the constant amplitude of the magnetizing field current. The resistive rotor current is frequency independent and can be controlled without disturbing the field current of being disturbed by the field current. This can be defined decoupled control of the two currents. Thus the major features of field oriented control, decoupling and quadrature, are naturally obtained, thanks to the optimal modulation frequency.

Thus, there is provided a control system for an AC induction motor, comprising a stator, a rotor, at least two stator windings and rotor windings, said control system comprising control signals, a first vector rotator for rotating said control signals with a first angle ($\alpha$) for providing output signals connected to frequency inverters for providing drive signals to each stator winding of the motor, said first angle ($\alpha$) being the time integral of a rotation frequency (w) which is controlled essentially for maintaining the amplitude of the magnetizing currents of each stator winding constant. According to the invention, the control system comprises a means for measuring the voltages and/or currents of said drive signals, at least a second vector rotator for counterrotating said measured voltages and/or currents with a second angle ($-\alpha$) which is the inverse of said first angle ($\alpha$); a means for controlling said rotation frequency (w) in dependence of said counterrotated measured voltages and/or currents essentially for maintaining the amplitude of said magnetizing currents of each stator winding constant. Preferably, both said voltages and currents of said drive signals are measured; and a calculation means calculates air-gap voltages ($E1^*, E2^* \ldots$) for each stator winding according to the formulas: ( the measured quantities and quantities derived therefrom being indicated with "*").

$$E1^* = V1^* - Is1^* Rs$$

$$E2^* = V2^* - Is2^* Rs \ldots$$

then, the second vector rotator counterrotates each air-gap voltage ($E1^*, E2^* \ldots$) for providing an output control signal ($E^*$) for calculating a rotation frequency (w) according to the formula:

$$w = E^*/ImL$$

Said first angle ($\alpha$) is obtained as the time integral of said rotation frequency (w).

Although the present invention is based on an extremely simple motor model, it permits mathematically exact control. The leakage inductances can be neglected or included in the motor model. The new control system is inherently insensitive for variations in the rotor resistance. Compensation for variations in the stator resistance can be made.

BRIEF DESCRIPTION OF THE DRAWINGS

The invention is described in more details below by reference to the appended drawings of preferred embodiments of the invention, in which.

Figure 3:
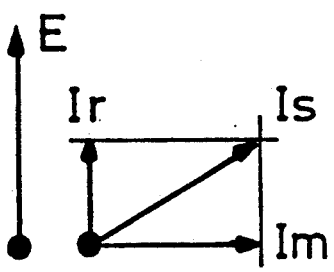
FIG. 3 is a vector diagram for FIG. 2 showing the relationship between the magnetizing current, the rotor current and the total stator current and the direction of the air-gap voltage.
Figure 4:
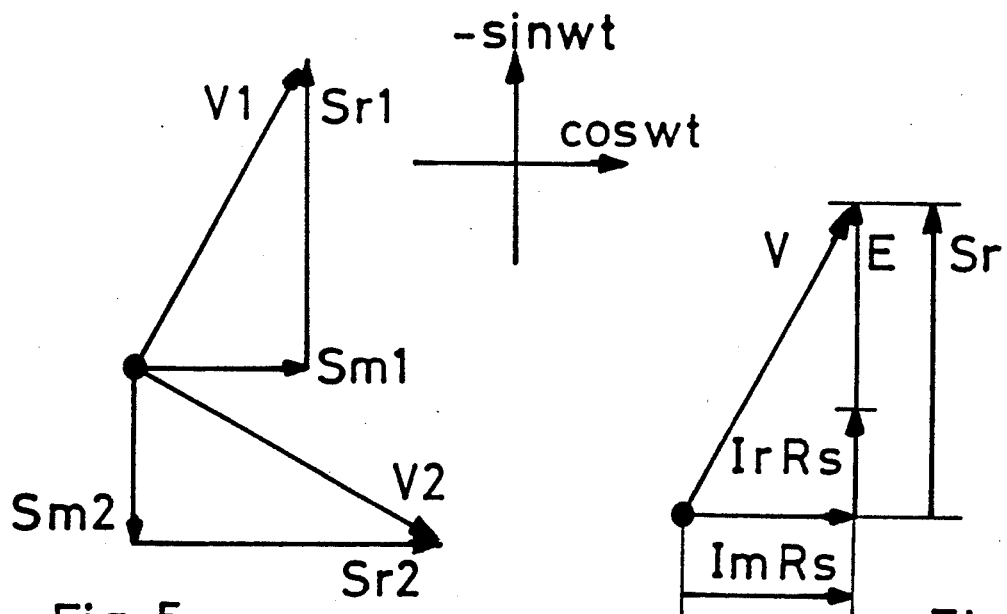
FIG. 4 is a vector diagram showing voltages of FIG. 2.

For the present description certain conventions will be adopted for clarity. All quantities relating to field coordinates (to the left of the vector rotators in all figures) will be expressed as quantities with index "m" and "r" (and "s") meaning quantities with the phase angle parallel with inductive and resistive directions as shown in FIGS. 3 and 4. They may vary in time but the time dependence is not related to the rotation of the control signals by the vector rotator. All quantities relating to stator coordinates (to the right in all figures) will be expressed as quantities with index "1", "2", . . . relating to a stator winding 1, 2 . . . Usually there are two or three stator windings relating to two-phase and three-phase motors although other numbers of phases are possible. All measured quantities are indicated with "*" (not in the figures due to clarity), also quantities derived from measured quantities.

"Estimation" is an established term in modern control theory. If a variable cannot be measured directly, it can be measured indirectly (=estimated) by help of other variables, which are possible to measure, plus calculations. The present invention is based on estimated values of the airgap voltage in the motor.

Certain conventions are necessary for the vector diagrams in the drawings.

Field oriented control is a geometric control principle. The field orientation is related to the geometric field angle. Thus complex vectors are used to describe voltage, current and field vectors in a geometrical plane. These geometrical vectors must not be confused with the complex electrical vectors used to describe sinusoidal alternating quantities in classical AC circuit theory.

Phenomena in the AC induction motor can be described by help of both vector types, but not by both types simultaneously. A choice must be made. The description of the present invention concentrates on phenomena in one single motor phase. Thus, the classical AC circuit theory will be used in the first part of the description, with complex electrical vectors.

The same vectors will be considered as geometrical vectors in the second part of the description. Then, the vector direction is directly related to the physical direction in the motor, and the vector rotator performs a true geometrical conversion between different coordinate systems. A suitable motor model for this type of description is given in chapter 10 of the book "Control of Electric Drives" by W. Leonhard, Springer Verlag.

A complex electrical vector is described by one single voltage or current. With this mathematical model each terminal on the vector rotator controls a complete electrical vector. Thus, the vector rotator has two input vectors and two output vectors, one for each motor phase.

A complex geometrical vector is described by two different voltages or currents. (Compare for example with Lissajoux figures on an oscilloscope, created by two voltages.) Thus, two terminals on the vector rotator are required for the description of one geometrical vector.

It is confusing that a vector diagram can serve two purposes, and thus the actual vector type must be accurately defined in the description.

DESCRIPTION OF PREFERRED EMBODIMENTS

First the underlying theory will be explained in details.

Then, the present invention will be described in two basic and two alternative versions plus some possible variations.

The present invention relates to qualified control systems for high performance applications, for example servo applications.

Conventional Field Oriented Control has been known for approximately 20 years. It is based on field measurement in the AC induction motor. This is a two-dimensional measurement. Normally, the measurement result is converted to a field angle and a field amplitude. When the field angle is known, it is easy to create "field oriented" control signals for the motor. A "vector rotator" converts the control vector from field coordinates to stator coordinates. Thus the control vector can be "synchronized" to the rotating field in the motor which is named field orientation. When the field amplitude is known, it is easy to make a separate control loop for the amplitude.

The field oriented control process may be described as a conversion of the AC induction motor to a DC motor. The basic idea is very clear and simple. Unfortunately, it is very difficult to measure the field, and consequently, it is difficult to obtain optimal control.

An alternative approach is described in the Swedish patent No. 8000118. A vector rotator is still used, for conversion of the control vector from field coordinates to stator coordinates. But, instead of measuring the field angle, the control system generates an optimal modulation (=rotation) frequency for the vector rotator. It can be shown, that this control method results in optimal operating conditions in the motor. The control principle is presently called "Natural Field Orientation", in order to distinguish it from conventional Field Orientation.

Natural Field Orientation can be defined as a method to obtain correct field orientation by help of constant amplitude of the magnetizing currents in each phase which results in quadrature between the magnetizing current and the rotor current. The constant amplitude is obtained by making the frequency proportional to the airgap voltage.

Natural Field Orientation can be described as an open loop control system. It creates optimal control signals for the motor and trusts that the motor itself operates correctly. It should be observed that the AC induction motor has been used in a similar way for 100 years, operating on the fixed frequency and voltage of the line.

According to the Swedish patent No. 8000118 the rotor speed is measured. The speed measurement is important, especially for the performance at low speed.

Said control system creates a voltage control vector (Sm, Sr) in field coordinates. Sm is constant and Sr is the external control signal. An optimal frequency signal w is calculated as a function of the signal Sr and the rotor speed. The frequency w is integrated, resulting in the control angle α for the vector rotator. The optimal frequency w keeps the magnetic stator field amplitude constant at all speeds and at all loads. It will be shown that this is a necessary condition for optimal motor operation.

Said control system controls the rotor circuit by the voltage Sr. Such voltage control gives the AC induction motor the same characteristics as a voltage controlled DC motor, essentially with the speed proportional to the control voltage. This is a limitation in such cases where direct torque control by help of the rotor current is wanted.

Another limitation is the need for a speed sensor (or position sensor) on the motor. In many applications it is difficult or unpractical to mount a speed sensor on the motor.

The present invention describes a simple, improved method to obtain motor control with Natural Field Orientation.

As a basis for the present invention an extremely simple system model will be described. This model is a development and improvement of the system model in the Swedish patent No. 8000118.

The theory is studied in a two-phase motor. Conversion to and from three or more phases is trivial.

Classical theory describes the induction motor by help of the rotating magnetic field at synchronous speed, which "drags" the rotor with a slightly lower speed, caused by the "slip".

Here the induction motor will be described as an equivalent to the DC motor, with transformer coupling to the rotor circuit. In a transformer, a current is transformed from the primary to the secondary winding. As a secondary effect a magnetic field is developed in the transformer, but this field has no practical use. However, in the AC induction motor both the transformation of current and the generation of a magnetic field contribute to the generation of torque.

Like all systems for field oriented control the new system makes use of a vector rotator for conversion of a control vector from field coordinates to stator coordinates. The control problem can be divided in two parts:
A) to control the rotation angle of the vector rotator,
B) to generate a control vector in field coordinates.

The first part of this description will described the generation of a control angle for the vector rotator.

Figure 1:
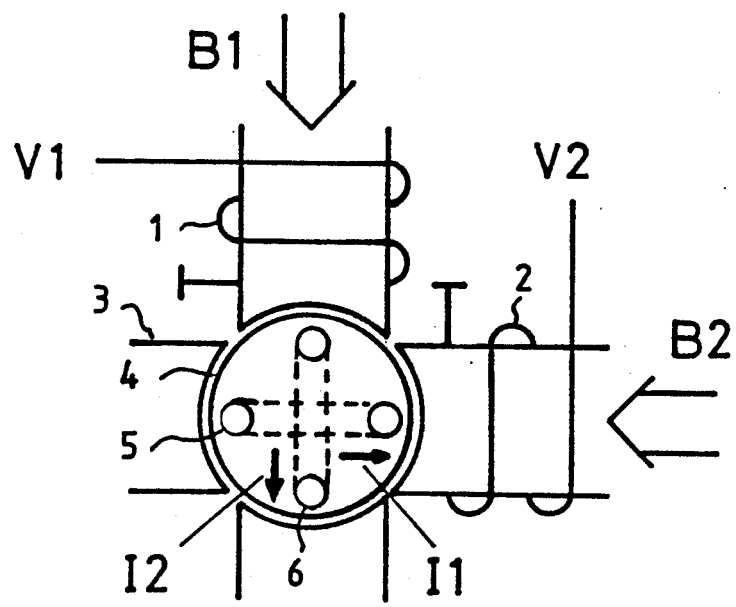
FIG. 1 is a schematic diagram showing the symbol of a two-phase AC induction motor.

FIG. 1 is a schematic diagram of a two-phase, two-pole AC induction motor comprising a stator 3 having two orthogonal stator windings 1, 2, a rotor in the nature of a squirrel cage rotor having a plurality of rotor windings 5, 6 each having a single short-circuited turn and two of which are shown in FIG. 1. Each phase operates as a transformer. Each stator winding 1, 2 is a primary winding with two tasks. It transforms a current to the secondary winding 5, 6 in the rotor, and it creates a magnetic stator field, with the components B1 and B2.

Consider operation on 50 Hz two-phase line voltage. With slightly idealized conditions:

$$V1 = -V0 \sin wt \quad B1 = B0 \cos wt \quad I1 = -I0 \sin wt \quad (1)$$

$$V2 = V0 \cos wt \quad B2 = B0 \sin wt \quad I2 = I0 \cos wt \quad (2)$$

$$\text{Torque} = C(\text{constant}) \times (I2 \times B1 - I1 \times B2) = -C \times I0 \times B0 \quad (3)$$

Torque is generated exactly as in a DC motor, by a rotor current in a magnetic field from the stator. (There are other mathematical descriptions of the torque generation, but here this is a suitable model.) Torque is created without ripple thanks to the trigonometrical relations. The rotor current from phase 1 creates torque together with the magnetic field from phase 2, and vice versa. There is a perfect cooperation between the two phases, thanks to:
1. The 90° geometrical difference between the phases.
2. The 90° time difference between the two phases in the supply voltage, resulting in the same 90° time difference between the two phases of the magnetic field and between the two phases of the rotor current.
3. The 90° time difference in each phase between the magnetic field component and the rotor current component.

This can be described as "natural field orientation", created by the motor itself. It is robust, safe and simple. The same principle will be used in the present invention, but the operating range will be extended from line frequency down to and including 0 Hz.

All the 90° relations above are necessary for optimal motor operation. The first two relations are automatically obtained by the motor design and by the definition of a two-phase system. The third relation must be created by the control system. It will be described as "quadrature".

The motor has a symmetrical design. All phases have equal value and must be controlled in the same way, however, with 90° mutual phase angle. Consequently, it should be enough to study one phase. If one phase is correctly controlled, and the other phase is controlled in the same way, the whole motor must operate correctly. This important observation greatly simplifies the theory. The system model can be reduced from a two-dimensional geometrical system to a one-dimensional system during the initial studies.

The control strategy will be: Study phase 1 and control the rotor current, which creates the torque. This is the primary purpose of the control system. Make sure that phase 1 simultaneously generates a correct magnetic field. The filed is necessary for phase 2. If phase 2 is controlled by the same rules, phase 1 will be sure to receive a field from phase 2.

Figure 2:
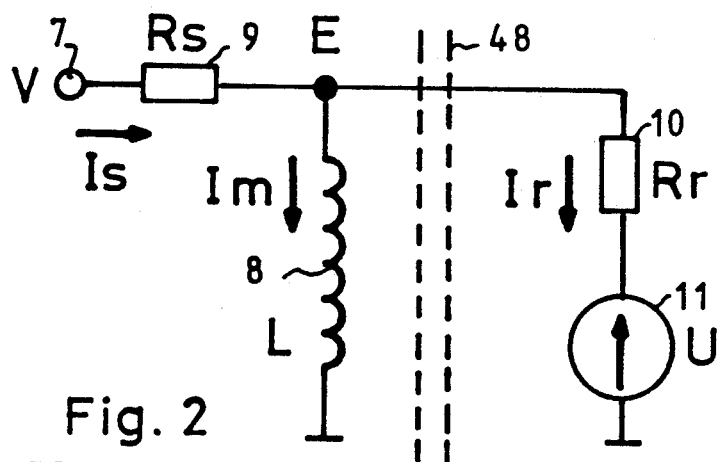
FIG. 2 is a schematic diagram showing the equivalent circuit of one phase of the AC induction motor, according to the conventional transformer model.

One phase will now be studied. FIG. 2 shows the conventional transformer model of one phase of the AC induction motor comprising a stator terminal 7, a main inductance 8, a stator resistance 9, a rotor resistance 10 and a counter EMF 11. The leakage inductances have been neglected, and are not shown. They can be included in the model later. The broken lines 48 symbolize the airgap between rotor and stator. The model is conventionally defined with a transformation ratio of 1:1 between stator and rotor circuits. A current Im through the main inductance creates a magnetic field, which passes through the stator and the rotor. A stator voltage V is connected to the stator terminal 7 resulting in a stator current Is. An airgap voltage E is developed over the main inductance 8. The iron is assumed to have linear magnetic properties. Thus there is a linear relation between the magnetic field and the magnetizing current. The magnetizing current is also called "field current". The airgap voltage E is transformed through the airgap to the rotor, where a rotor current Ir is developed. Torque is proportional to the rotor current Ir. The following quantities are used:

Rs = stator winding resistance 9
Rr = rotor winding resistance 10
L = main inductance 8
U = counter EMF 11
V = terminal voltage
E = "airgap voltage"
Im = magnetizing current or field current
Ir = rotor current
Is = stator current According to classical AC circuit theory, a modulation with sin wt or cos wt is not shown. The voltages and currents are defined by their amplitudes (peak values, not RMS values).

It will be shown that counter EMF U is modulated with the same phase angle as the airgap voltage E and the rotor current Ir.

Both the magnetizing current Im and the rotor current Ir are functions of the airgap voltage E.

$$Ir = (E - U)/Rr \quad (4)$$

$$Im = E/(j \, w \, L) \quad (5)$$

w = the modulating frequency

According to the present invention, the rotor current Ir shall always be controlled according to equation (4), either by a voltage or a current source, connected to the motor terminal 7. This is the primary control function.

The magnetizing current Im shall always be controlled according to equation (5), by adjusting the frequency w. This is a secondary control function. For any given value of E, it is always possible to obtain the desired current Im by adjusting the frequency w. This will not change the rotor current Ir, which is entirely resistive and thus frequency independent. "DECOUPLING" (= independent and individual control of Im and Ir) is thus obtained by help of E and w. "QUADRATURE" (= 90° phase angle between Im and Ir) is automatically obtained as long as the amplitude of the magnetizing current Im is constant. This is true for all frequencies w and all waveshapes, not only for sinewaves. An exact mathematical definition or a mathematical proof is not given here.

In order to obtain a constant amplitude of the magnetizing current Im it is sufficient to have a constant and linear relation between the airgap voltage E and the frequency w, according to equation (5). This is an important part of the control strategy according to the present invention. The frequency will always be controlled by E according to the equation:

$$w = E^*/(Im \, L) \quad (6)$$

where
Im = the desired amplitude of the magnetizing current
E* = an estimated value of the airgap voltage amplitude
L = the main inductance.

The equation (6) is valid also when E* = 0, and for positive and negative values of E*. A negative value of w means that the field vector rotates in a negative direction.

Decoupling and quadrature are the major features of conventional field oriented control. Here they are obtained in a natural way, almost automatically, if equation (6) is satisfied.

It should be noted that decoupling by definition permits two degrees of freedom for controlling the two currents Im and Ir. By sacrificing the one degree of freedom, i.e. by keeping the magnetizing current Im constant, quadrature is obtained in exchange.

Figure 5:
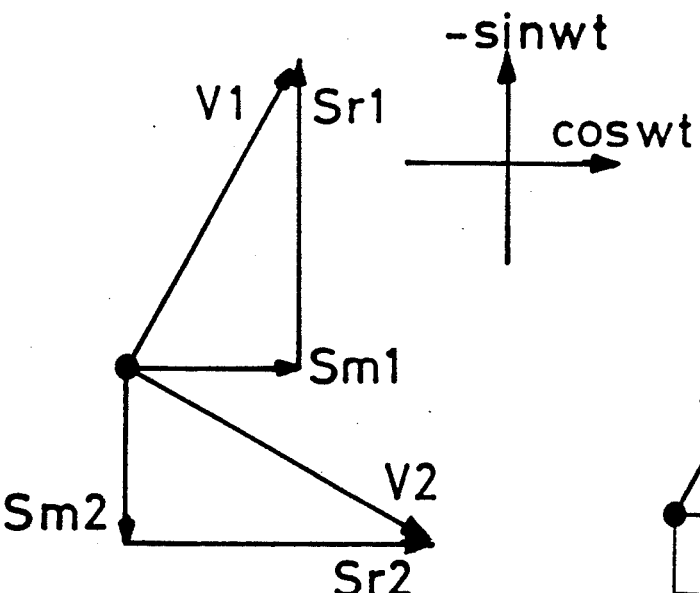
FIG. 5 is a two-phase version of the vector diagram in FIG. 4.

FIGS. 3, 4 and 5 are defined according to classical AC circuit theory with complex electrical vectors. Positive modulation is conventionally described by a counter-clockwise rotation of the whole diagram around the origin, with the vectors projected on the real axis.

FIG. 3 defines the relationship between the airgap voltage vector E and the current vectors Im and Ir from FIG. 2. Also the total stator current Is is shown. The airgap voltage E is used as reference vector arbitrarily defined in vertical direction. The currents are studied as functions of E according to equations (4) and (5) and not as functions of the terminal voltage V. This "trick" makes the mathematics and the vector diagram very simple. E and Ir have the same phase angle, and Im has 90° phase delay. It also makes it possible to define a control vector in a simple way.

When the directions of the airgap voltage vector E and the two current vectors Im, Ir are defined, it is easy to draw a complete voltage vector diagram.

FIG. 4 is a voltage vector diagram of the circuit shown in FIG. 2, based on the vectors in FIG. 3. The resistive voltage drops in the stator resistance due to the current Ir, Im have been added to the airgap voltage E. The terminal voltage vector V is obtained as the sum of all vector components.

In the basic version of the control system (voltage control), the voltage vector V is generated as the sum of two vector components Sm and Sr:

$$\underline{V} = \underline{Im} \, Rs + (\underline{E} + \underline{Ir} \, Rs) = \underline{Sm} + \underline{Sr} \quad (7)$$

E, Sm, Sr, Im, and Ir have constant phase angles (by definition) but the phase angle of V can change between plus and minus 90 degrees. (Sr can be positive as well as negative.)

FIG. 5 shows a complete vector diagram for two motor phases with 90° phase difference. Also the modulation is defined:

$$V1 = Sm1 \cos wt - Sr1 \sin wt \quad (8)$$

$$V2 = Sm2 \sin wt + Sr2 \cos wt \quad (9)$$

where
w = time modulation frequency
t = time

The modulation can be made by help of four multipliers and then the complete signals V1, V2 are obtained by addition of two components each. Equations (8) and (9) describe the drive voltages for a two-phase motor.

It was said before that all phases must be controlled in the same way, although with different phase angles. Thus:

$$Sm1 = Sm2 = Sm \quad (10)$$

$$Sr1 = Sr2 = Sr \quad (11)$$

Consequently, the two output voltages are generated by only two input signals Sm and Sr and the different phase angles are created in the modulation circuit.

So far it has been convenient to study one motor phase and use classical AC circuit theory with electrical vectors. But now the complete motor will be studied, and now the vector diagram in FIG. 4 will be defined as a geometrical vector diagram in field coordinates. In order to describe one complete vector, two components are needed, one real part Sm and one imaginary part Sr. The complete vector will be written as (Sm, Sr).

By definition, the new vector (Sm, Sr) is stationary in relation to the rotating field in the motor, or in other words "synchronized" to the rotating field. The vector components Sm and Sr are created by control system as DC values and shall be connected as control signals to a vector rotator, which transforms then from field coordinates to stator coordinates, creating an output vector (V1, V2) as two components V1 and V2 with AC values, before they are connected to frequency inverters and the stator windings.

A vector rotator can mathematically be described by a complex expression:

$$e^{j\alpha} = \cos\alpha + j\sin\alpha \quad (12)$$

The angle $\alpha$ is positive in counter-clockwise direction, starting from the horizontal axis (the real axis in a complex diagram).

The vectors (Sm, Sr) and (V1m V2) are defined as complex vectors $\underline{S}$ and $\underline{V}$:

$$\underline{S} = Sm + jSr \quad (13)$$

$$\underline{V} = V1 + jV2 \quad (14)$$

Vector $\underline{S}$ is rotated the angle $\alpha$ for generating vector $\underline{V}$: Thus $$\begin{aligned}\underline{V} &= V1 + jV2 = Se^{j\alpha} = (Sm + jSr)e^{j\alpha} = \\ &= (Sm + jSr)(\cos\alpha + j\sin\alpha) = \\ &= Sm\cos\alpha - Sr\sin\alpha + j(Sr\cos\alpha + Sm\sin\alpha)\end{aligned} \quad (15)$$

Thus:

$$V1 = Sm\cos\alpha - Sr\sin\alpha \quad (16)$$
$$V2 = Sr\cos\alpha + Sm\sin\alpha \quad (17)$$

This is the same result as in equations (8) and (9). However, the geometrical angle "$\alpha$" is used instead of the electrical angle "wt" in FIG. 5. Equations (8) and (9) were taken directly from FIG. 4b but the same result can be obtained by the conventional method in classical AC circuit theory:

$$V1 = Re|(Sm1+jSr1)e^{jwt}| = Sm1\cos wt - Sr1\sin wt \quad (18)$$

$$V2 = Re|(Sr2-jSm2)e^{jwt}| = Sm2\sin wt + Sr2\cos wt \quad (19)$$

The complex vectors (Sm1+jSr1) and (Sr2−jSm2) are defined by FIG. 5.

The interpretation of equations (8) and (9) or (18) and (19) as two individual voltages and of equations (16) and (17) as one geometrical voltage vector in the stator plane gives the same result. The geometrical vector $\underline{V}$ can be represented by vector V1 in FIG. 5. In this case vector V2 is excluded.

Figure 6:
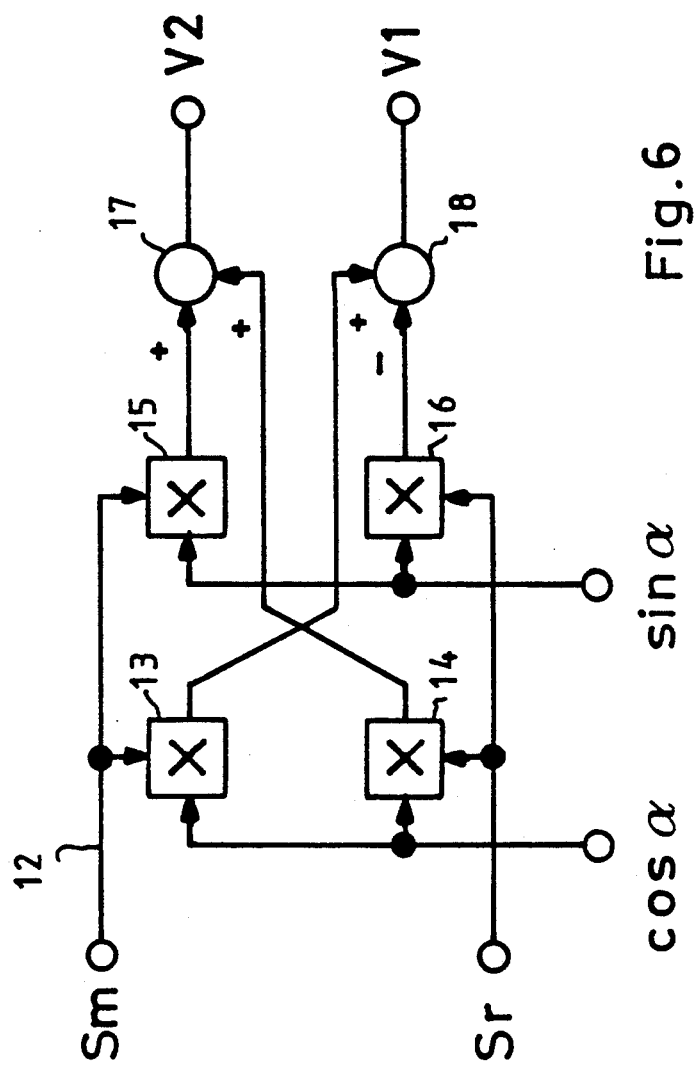
FIG. 6 is a block diagram of a vector rotator.

FIG. 6 is a block diagram, showing the mathematical functions in a conventional vector rotator 12, according to equations (16) and (17). For two phases, there are four multiplying circuits (13–16) and two summing circuits 17, 18. The input vector (Sm, Sr) is rotated with angle $\alpha$ and the output vector is (V1, V2).

Figure 7:
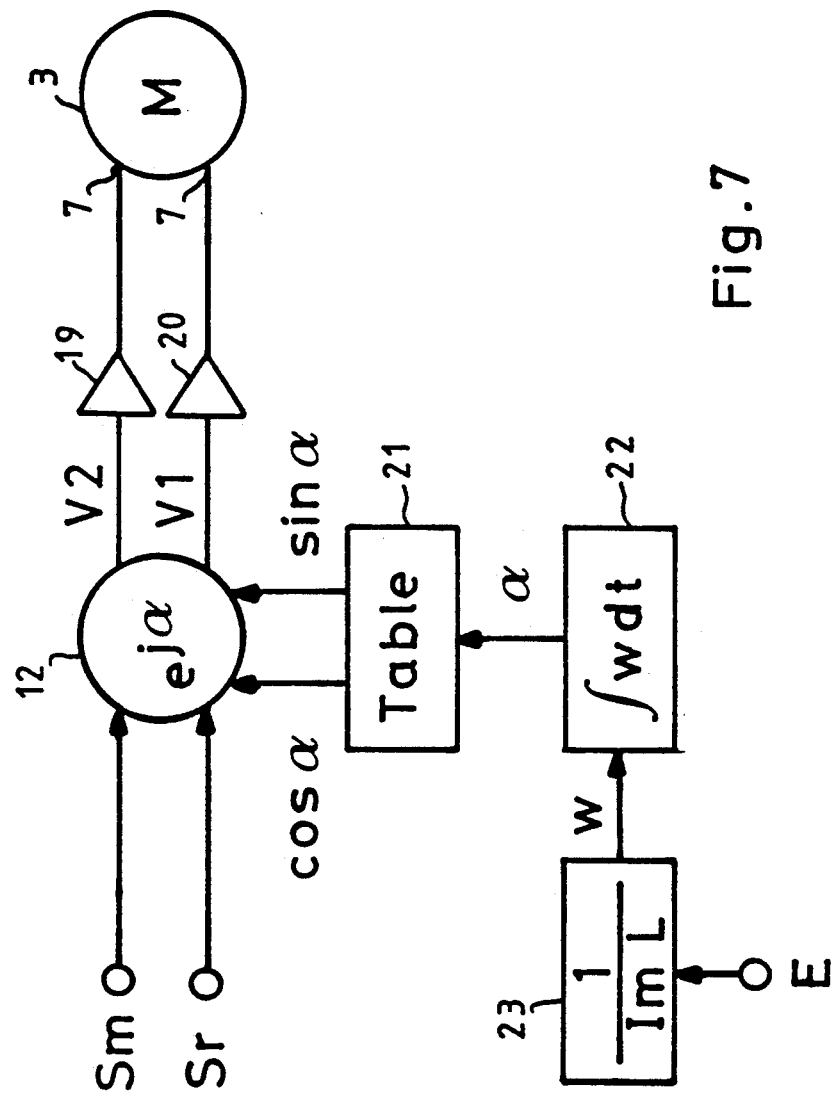
FIG. 7 is a block diagram showing the central structure of a control system according to the invention.

FIG. 7 shows the central structure of a control system according to the present invention, with a control vector (Sm, Sr) in field coordinates connected to a vector rotator 12 and an output vector (V1, V2) in stator coordinates, connected to a motor 3.

There are "power stages" 19, 20 (=frequency inverters) between the vector rotator 12 and the motor 3 and they are assumed to be ideal elements, operating either as voltage sources or current sources. As an example they can be designed as PWM transistor inverters. In the present model they don't change the signal amplitude (voltage or current gain=1). In a practical circuit they may have a certain gain.

There may be local control loops inside each frequency inverter. Such loops are not considered in the present description.

The vector rotator 12 is controlled by signals (sin $\alpha$, cos $\alpha$) from a trigonometrical table 21. The input angle $\alpha$ to the table 21 comes from an integrator 22, which integrates the input frequency w and delivers the output angle $\alpha$, which is the time integral of the frequency w. The angle $\alpha$ is equal to wt for steady state operation with constant w and sinusoidal signals. Block 23 calculates the rotation frequency w as a function of an estimated airgap voltage E* according to equation (6).

The integrator 22 may have a certain input offset resulting in an output drift. This is no problem as long as the drift error is sufficiently small. The integrator is a "modulo-$2\pi$" integrator which integrates in a tangential direction around a unit circle, and it can never come to an end stop. In a practical system the integrator may be a binary up-down counter, which counts upwards to its maximum value and then continues directly to zero on the next count, and similarly in the downward direction.

The sign of the estimated value E* can be positive as well as negative. It depends on the operating conditions. The sign of E* determines the direction of rotation of the vector rotator.

In order to obtain correct magnetizing current, the voltage drop (Im, Rs) in the stator resistance must be compensated. This is made by a voltage vector component Sm, described in equation (7).

The described method for frequency generation keeps the magnetizing current (Im) constant. The rotor circuit is entirely resistive and thus insensitive to frequency variations. Thanks to this, there is no interaction from the magnetizing circuit to the rotor circuit. And conversely, the magnetizing circuit is not disturbed by the rotor circuit and variations in E. Actually, the magnetizing current has been "compensated" for variations in E. Thus, the system permits "decoupled" control of the rotor current and the magnetizing current.

A consequence of this analysis is, that the AC induction motor always must be operated with a constant magnetic field amplitude, in order to obtain optimal operating conditions. A change in field amplitude will always give a momentary quadrature disturbance. This is inherent in the motor, and no control system can change that. Fortunately, the normal practice is to operate the motor with constant magnetic field.

Field weakening will be possible by change of parameters and control values, but always at the cost of degraded dynamic performance (momentary loss of quadrature).

The control system according to the present invention is based on estimation of the airgap voltage amplitude E*. Other solutions for field orientation have been tried, where the airgap voltage En* in each individual phase is estimated and then integrated in order to create an estimate of the magnetic field. Such solutions suffer from a problem with integrator offset and drift, and consequently they cannot be used down to zero frequency. The present solution doesn't suffer from this problem.

There were two parts of the control problem. Control problem A has been solved. It remains to generate a control vector.

The rotor current Ir in FIG. 2 is controlled by the airgap voltage E, regardless of how this voltage is created. Consequently, the motor can be controlled at the terminal 7 by voltage source frequency inverters as well as current source frequency inverters.

If voltage source frequency inverters are used, the total control vector shall be generated as the sum of two orthogonal components Sm and Sr, according to equation (7) and the same as in the Swedish patent No. 8000118. Sm is normally constant and represents the voltage drop in the stator resistance, caused by the constant magnetizing current. Sr is the active control variable. It controls the motor and primarily the rotor circuit, exactly as if it was a DC motor. Sr is composed of the voltage drop in the stator resistance caused by the rotor current, plus the airgap voltage E. The airgap voltage E is composed of the voltage drop in the rotor resistance caused by the rotor current, plus the counter EMF U.

It is observed that the constant Im in block 23 has the same value as the constant Im in equation (7) and represents the desired magnetizing current, which according to the present invention should be constant.

Figure 8:
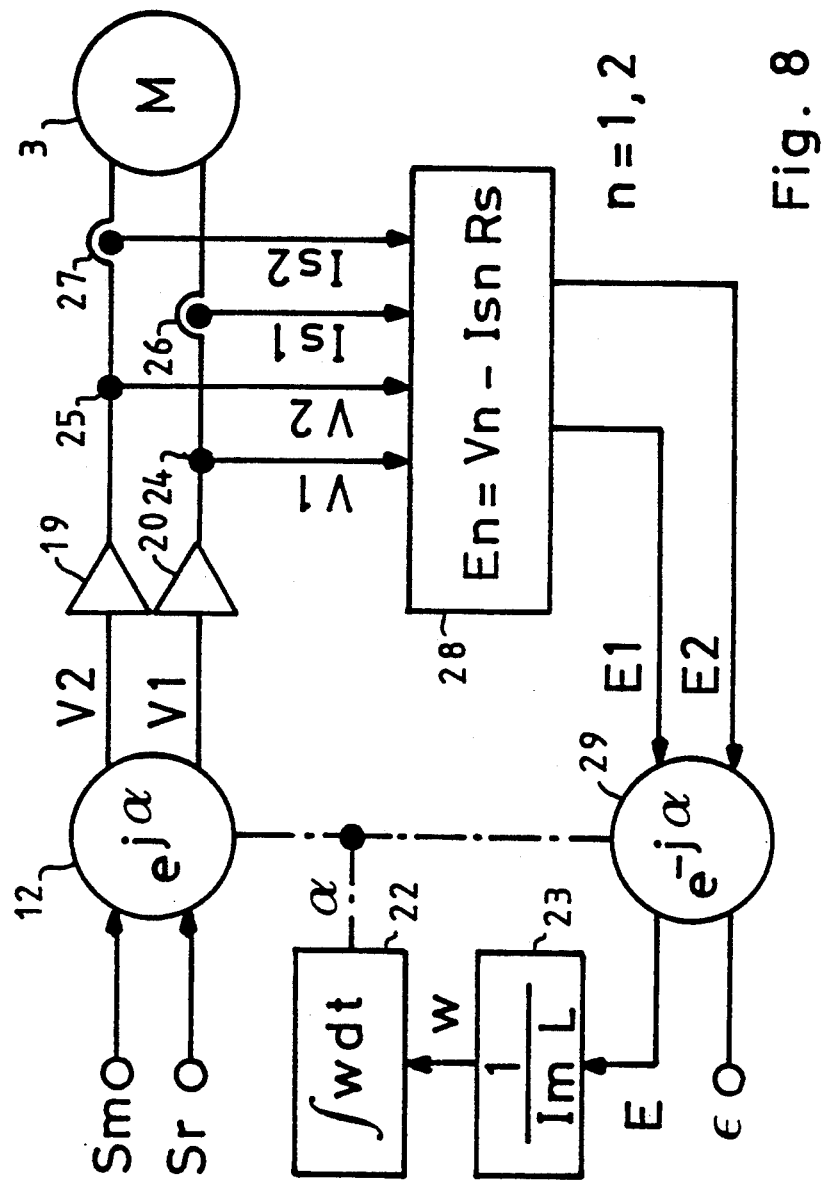
FIG. 8 and 9 are block diagrams showing two different versions of the control system according to the invention.

FIG. 8 shows a complete control system according to the present invention for Natural Field Orientation, based on the block diagram in FIG. 7. For simplicity block 21 is not shown. The phase voltages V1, V2 at the motor terminals 7 are measured by measuring devices 24, 25 and the phase currents Is1, Is2 are measured by measuring devices 26, 27 and connected to a calculating block 28. Block 28 calculates the airgap voltage vector (E1*, E2*) according to the formulas:

$$E1^* = V1^* - Is1^* Rs \quad (20)$$

$$E2^* = V2^* - Is2^* Rs \quad (21)$$

where:
V1*, V2*, Is1*, Is2* = measured instantaneous values
E1*, E2* = values calculated from measured values (= estimated values)
Rs = the stator resistance The equations can be obtained from FIG. 2. However, the values E1* and E2* are AC values and cannot conveniently be used directly for calculating the rotation frequency w. Instead, values E1*, E2* are regarded as a rotating airgap voltage vector (E1* + jE2*) which is then transformed from stator coordinates to field coordinates in a vector counterrotator 29 rotating in the opposite direction as vector rotator 12. The output signals from the counterrotator 29 is a stationary airgap voltage vector (Em*, Er*) which should be parallel with Sr. Thus, Em* should be zero and is regarded as an error signal defined as ε. The airgap voltage vector component Er* is equalled to E* and is used as input signal to calculation block 23 for calculating the rotation frequency w.

If all measurements and calculations are correct, signal E* shall be identical with the vector E in FIG. 4 and the signal "ε" shall be zero. The vector E as well as the estimated signal E* can be positive or negative.

The estimated values E1* and E2* are instantaneous values and thus modulated. The transformed value E* has a constant amplitude without ripple. The vector counterrotator 29 may be described as a "synchronized demodulator". It is based on a multi-phase system. It wouldn't work in a one-phase system.

The counter EMF U in phase 1 is proportional to the product of the rotor speed and the magnetic field from phase 2. The field in phase 2 is modulated with the same phase angle as the airgap voltage in phase 1. Thus the voltages U and E in FIG. 2 are modulated with the same phase angle. They would be parallel in a vector diagram.

This version of the control system is essentially an improved version of the control system according to the Swedish patent No. 8000118, based on a different measuring system, but still with Natural Field Orientation.

The control characteristics are the same as for a voltage controlled DC motor. The control signal (Sr) essentially controls the rotor circuit and thus the speed.

This control system and the three following control systems don't need a speed sensor on the rotor shaft. On the other hand, a new measuring system for the airgap voltage is needed which is the object of the present invention.

The system in FIG. 8 operates with Natural Field Orientation. The voltage control vector (Sm, Sr) is connected to the vector rotator for conversion from field coordinates to stator coordinates. The control vector is not "synchronized" to the field by help of field measurements. Instead, the rotation of the vector rotator is controlled by the magnetizing circuit. The complete motor control system will automatically synchronize itself and create stable operating conditions. This is a great advantage with the AC induction motor. It is not necessary to known the rotor position. A magnetic field will be generated anywhere in the motor when the system is energized. Then the operation will continue from this initial value.

The conditions in the real motor will be the same as in FIG. 4 if the control system operates correctly. Thus, the vector component Sr can be used as a control signal, always with correct field orientation, i.e. with quadrature between the magnetizing current Im and the voltage Sr. The control system can be described as an open loop control system. Optimal control signals Sm, Sr and w are generated and then the system "trusts" that the motor will operate correctly. The system relies on stable motor parameters, essentially on the stability of the main inductance L.

Natural Field Orientation is obtained by help of a constant magnetizing current. This is the most important parameter to control. The control system for Im can be studied and described from several different points of view.

The magnetizing current Im is controlled by a closed loop system according to FIG. 8. The airgap voltage E is measured and used for calculation of an optimal frequency w, which is intended to keep the magnetizing current Im constant. But the magnetizing current is never directly measured and controlled by a feedback loop. Consequently, this is also an open loop control system for magnetizing current.

The explanation is that the magnetizing current depends on two variables, E and w, according to equation (5). Thus there are two degrees of freedom, and this requires two control loops. The closed loop according to the present invention generates a fixed relation between E and w. Then the numerical value of this relation defines the current Im according to equation (5), and this is the open loop control. The current depends on the value of the main inductance L. A variation of L gives a current change. This is characteristic for open loop control.

The main and only purpose of the closed loop in FIG. 8 is to make the magnetizing current Im independent of the airgap voltage E. The quotient between E and w will be correct for all values of E, thanks to the closed control loop. The loop works as a compensation for external disturbances, represented by the airgap voltage E. This is important, because the airgap voltage E is also part of the rotor circuit and changes within a very large range.

Figure 9:
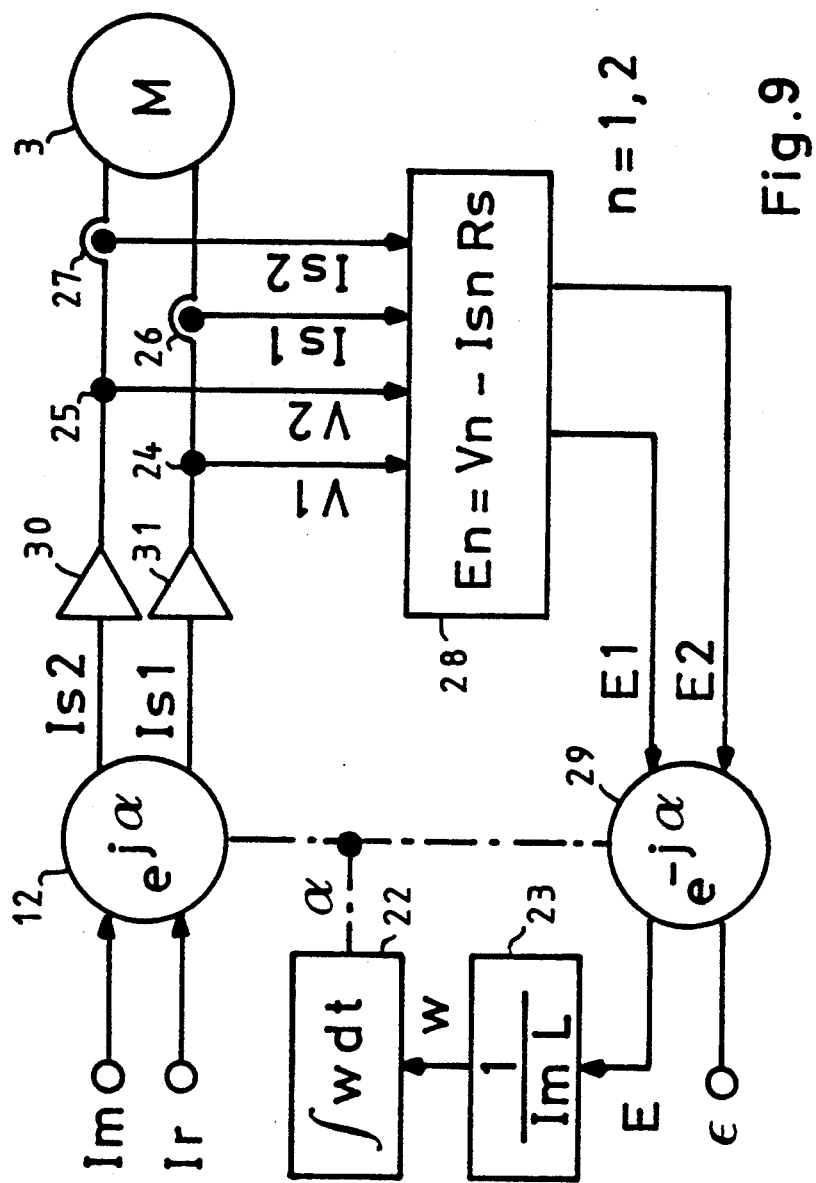

FIG. 9 shows an alternative version of the control system according to FIG. 8 in which current source inverters are used. The same designation numerals are used in FIG. 9 as in FIG. 8 for the same components. The control signal is a current vector (Im, Ir) and the vector rotator output signals are fed to current source frequency inverters 30, 31. The operation of the measuring system according to the invention is identical to FIG. 8 and the generation of the rotation frequency takes place in the same way. It is observed that the constant Im in block 23 has the same value as the control variable Im fed to the vector rotator 12 and represents the desired magnetizing current, which according to the present invention should be constant.

The control signal Ir is the real control variable. Ir controls the motor, and primarily the rotor circuit, exactly as if it was a DC motor.

The control characteristics are the same as for a current controlled DC motor. The rotor current Ir controls the torque.

As already described in the case with voltage control, the system will automatically synchronize and operate with correct field orientation, also in this case with Natural Field Orientation.

The current source frequency inverters will deliver the desired currents to the motor windings. The currents must flow through the winding impedances. The currents will create a voltage vector in the motor, which is the same as if the motor was controlled by a voltage source frequency inverter.

Exactly as in the case of a DC motor, the use of a current source has certain advantages. It permits direct control of the rotor current, and thus direct torque control. A good current source can deliver the desired current, independent of the circuit impedance. Thus the current source can "eliminate" or overcome the influence of the motor's leakage inductances. Further, the current source will deliver the desired current, independent of the resistance in the stator and rotor circuit.

Like the system in FIG. 8, this version of the control system is essentially an improved version of the control system according to the Swedish patent No. 8000118, based on a different measuring system, but still with Natural Field Orientation. Here current source frequency inverters are used instead of voltage source frequency inverters, and this is an important improvement.

Although the motor is current controlled the important function Natural Field Orientation is still based on voltage control, since the frequency is controlled by the estimated airgap voltage E*.

Figure 10:
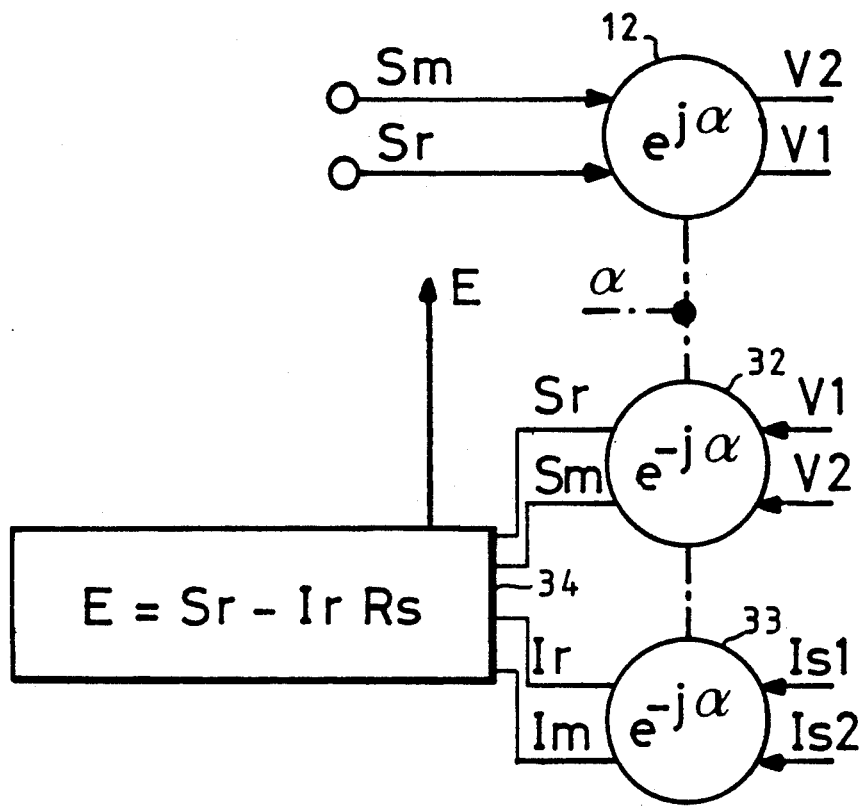
FIGS. 10, 11, 12 and 13 are block diagrams similar to FIGS. 8 and 9 and show further different versions of the control system according to the invention.

FIG. 10 shows a different version of the control system according to FIG. 8 in which each measured quantity V1*, V2*, Is1*, Is2* is separately counterrotated by two counterrotators, the first of which 32 counterrotates the voltages and outputs the voltage vector (Sm*, Sr*) and the second of which 33 counterrotates the currents and outputs the current vector (Im*, Ir*). Said voltage vector (Sm*, Sr*) and said current vector (Im*, Ir*) are fed to a calculating block 34 which calculates the airgap voltage according to the equation:

$$E^* = Sr^* - Ir^* Rs \qquad (22)$$

Equation (22) can be obtained from FIG. 4.

Figure 11:
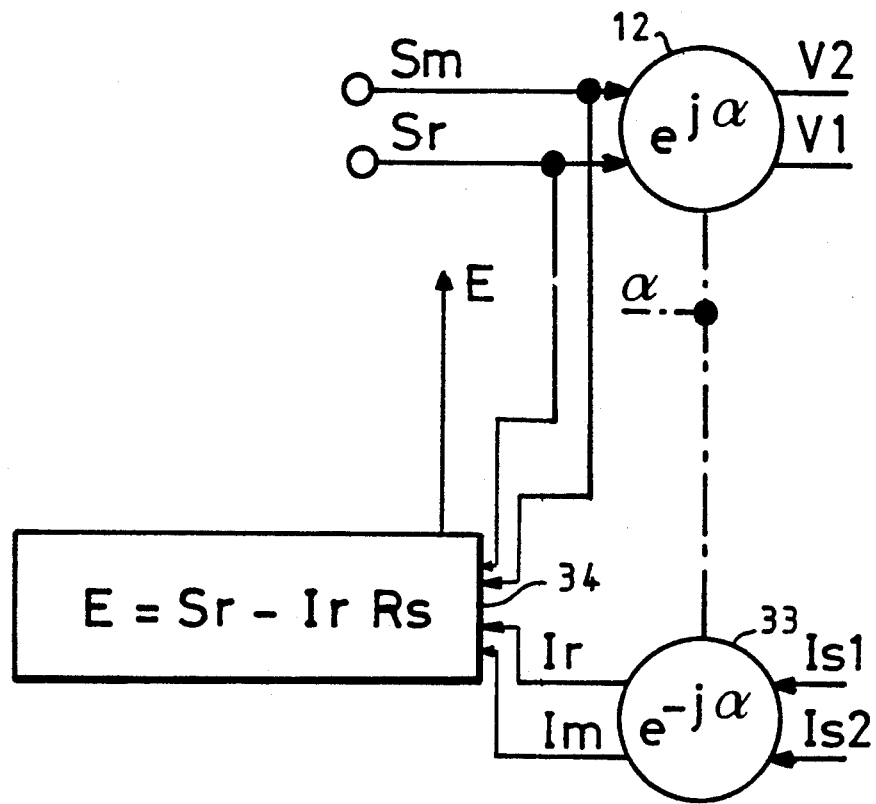

It is observed that the signals Sr, Sm already exist in field coordinates and thus it is not necessary to counterrotate said signals but they can be taken directly from the input to the vector rotator 12 as shown in FIG. 11. It is also noted that signals Sm* and Im* are not used in calculating block 34, and thus said signals represent redundant information which can be used for other purposes, see below.

Figure 12:
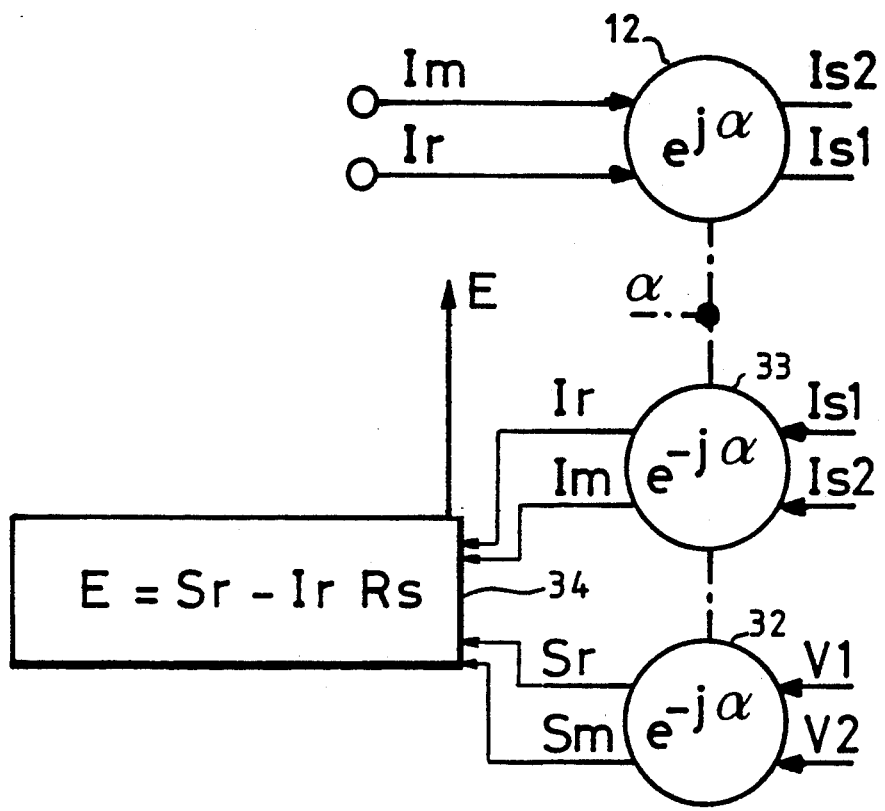

FIG. 12 shows another different version of the control system according to FIG. 9 in which each measured quantity V1*, V2*, Is1*, Is2* is separately counterrotated by two counterrotators, the first of which 32 counterrotates the voltages and outputs the voltage vector (Sm*, Sr*) and the second of which 33 counterrotates the currents and outputs the current vector (Im*, Ir*) similar to FIG. 10 but with current source frequency inverters 30, 31. Said voltage vector (Sm*, Sr*) and said current vector (Im*, Ir*) are fed to calculating block 34 as in FIG. 10.

Figure 13:
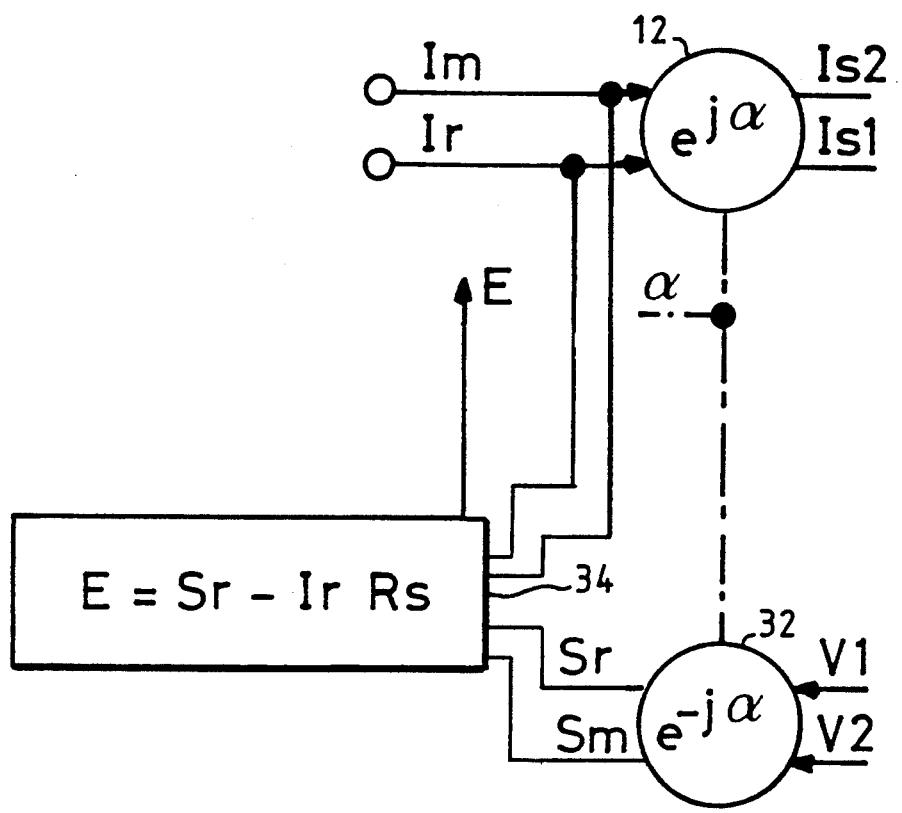

It is observed that the signals Ir, Im already exist in field coordinates and thus it is not necessary to counterrotate said signals but they can be taken directly from the input to the vector rotator 12 as shown in FIG. 13. It is also noted that signals Sm* and Im* are not used in calculating block 34, and thus said signals represent redundant information, see below.

The accuracy of the control system according to the present invention relies on a true measurement or estimation of the airgap voltage. The stator resistance (and the leakage inductance, see below) must be known for calculation of the airgap voltage. Instead of "estimating" the airgap voltage by help of voltage and current measurement plus calculation, it is possible to install separate measuring windings in the motor, which can measure the induced airgap voltage in the motor. (A certain current compensation of the measured values is necessary as is wellknown.) Also these measurement results must be counterrotated to field coordinates. However, this solution may be impractical in most cases and is not discussed further.

Figure 14:
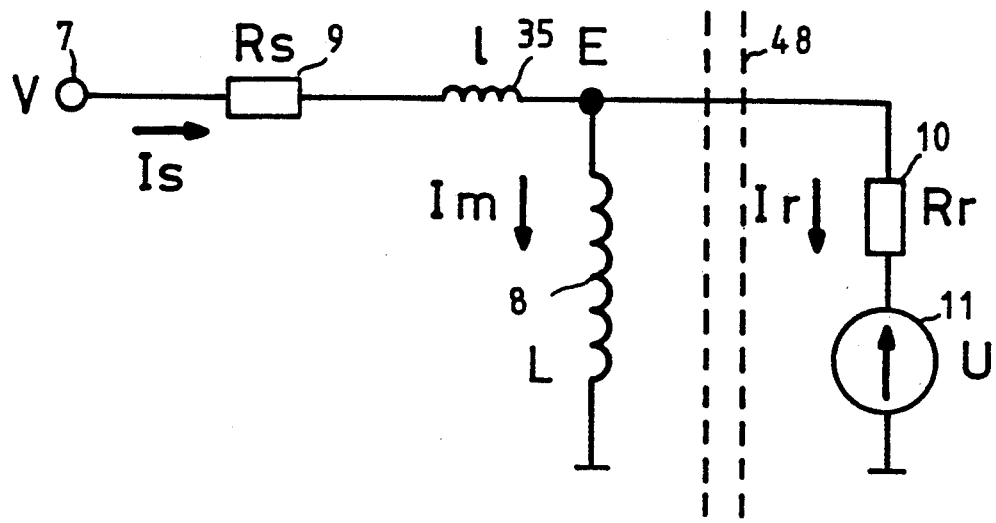
FIG. 14 is a schematic diagram similar to FIG. 2 but including the leakage inductance.

FIG. 14 shows a commonly used motor model including a single leakage inductance 35. The rotor leakage inductance (not shown) has been transformed to the stator side and added to the stator leakage inductance, resulting in one single leakage inductance 1.

It is noted that the other parameters of the motor model also are influenced upon by the transformation of the rotor leakage inductance to the stator side, and the model values are adjusted in accordance therewith when the effect of the leakage inductance is introduced in the motor model, see for example "Introduction to Field Orientation and High Performance AC Drives", chapter 2.6-2 "Modified Equivalent Circuit", Novotny-Lorenz, 1986 IEEE Industry Applications Society Annual Meeting.

Exactly like FIGS. 3, 4 and 5, FIGS. 14 and 15 are defined with electrical vectors according to classical AC circuit theory.

As an alternative to equations (20) and (21) a more exact calculation of the airgap voltage can be made:

$$E1^* = V1^* - Is1^*(Rs+sl) \tag{23}$$

$$E2^* = V2^* - Is2^*(Rs+sl) \tag{24}$$

where:
l = the value of l
s = Laplace operator

Equations (23) and (24) are more accurate than equations (20) and (21) and are preferred. The calculated vector (E1*, E2*) is connected to the second vector counterrotator 29 in FIG. 8 or FIG. 9. This counterrotator is controlled by the same angle $-\alpha$ as the first vector rotator 12, although in opposite direction.

The following equation is obtained from the upper part of FIG. 14:

$$\underline{V} = Rs\,\underline{Im} + Rs\,\underline{Ir} + jwl\,\underline{Im} + jwl\,\underline{Ir} + \underline{E} \tag{25}$$

Figure 15:
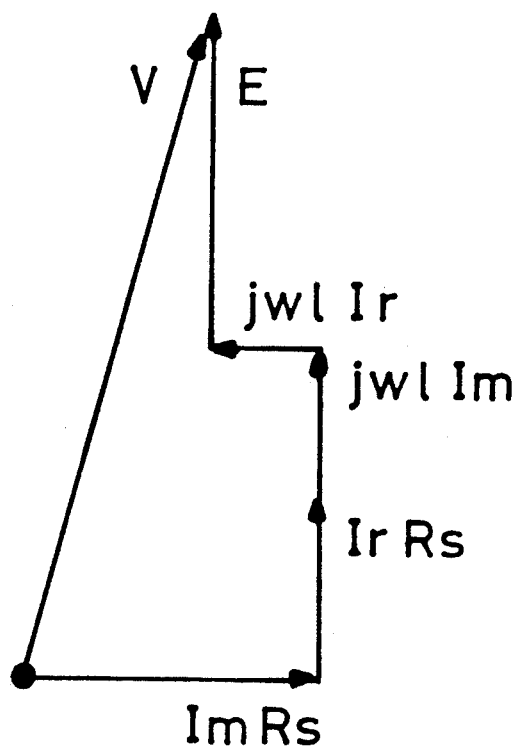
FIG. 15 is a vector diagram similar to FIG. 4 but including the leakage inductance.

FIG. 15 shows the vector $\underline{V}$, according to equation (25). The vector $\underline{V}$ can be created by two components Sm and Sr, similar to FIG. 4:

$$Sm = Rs\,Im - wl\,Ir \tag{26}$$

$$Sr = Rs\,Ir + wl\,Im + E \tag{27}$$

An improved control system can be designed with compensation for the leakage inductance by help of a correction term ($-wl\,Ir$) which is added to the original signal Sm. The necessary signal Ir can be obtained from the measuring system, by help of an addition to FIG. 8 similar to FIG. 10.

It is normally not necessary to compensate Sr for the leakage inductance, since Sr is externally generated, for example as an error signal in an external closed control loop.

FIG. 14 shows the leakage inductance l in series with the stator resistance Rs. An ideal motor would have zero leakage inductance. This is not possible to obtain, but it is possible to design a voltage source frequency inverter with negative output inductance, intended to cancel the effect of the motor's leakage inductance. This is described in the Swedish patent application No. 8902883-1. Such frequency inverters can be used together with a control system according to the present invention. Then the vector diagram in FIG. 4 will be valid also for the real motor including the leakage inductance, and the signals Sr and Sm can be generated according to this diagram. However, the calculation of airgap voltage according to equations (23) and (24) should still be used.

If current source frequency inverters are used, the leakage inductance in FIG. 14 will not disturb the control system, as can be proved by the following simple reasoning. The current sources are assumed to be "ideal" and deliver the correct currents independent of the circuit impedance. The correct total current Is (=Im+Ir) will flow through the stator resistance and the leakage inductance and reach the "airgap", where an airgap voltage E is created as a product of the total current and the impedance in the rest of the circuit. The total current Is will be divided in two components, magnetizing current Im and rotor current Ir. The airgap voltage E is measured and used for control of the magnetizing current, according to the present invention. Consequently, the magnetizing current will be constant, and thanks to this there will be quadrature between the magnetizing current and the rotor current. There is only one possible way to divide the stator current Is into two separate currents, under the given conditions. Thus the two currents will be created exactly, at least in theory, as they have been commanded in field coordinates by the control system. Consequently, the commanded currents will control the motor with perfect field orientation, in this case with Natural Field Orientation. The system is not disturbed by the stator resistance or the leakage inductance. (The only effect of the leakage inductance is that the terminal voltage V will be slightly higher because of the voltage drop in the leakage inductance.) These favourable conditions are a reason why current source frequency inverters are preferred for a control system according to the present invention.

Figure 16:
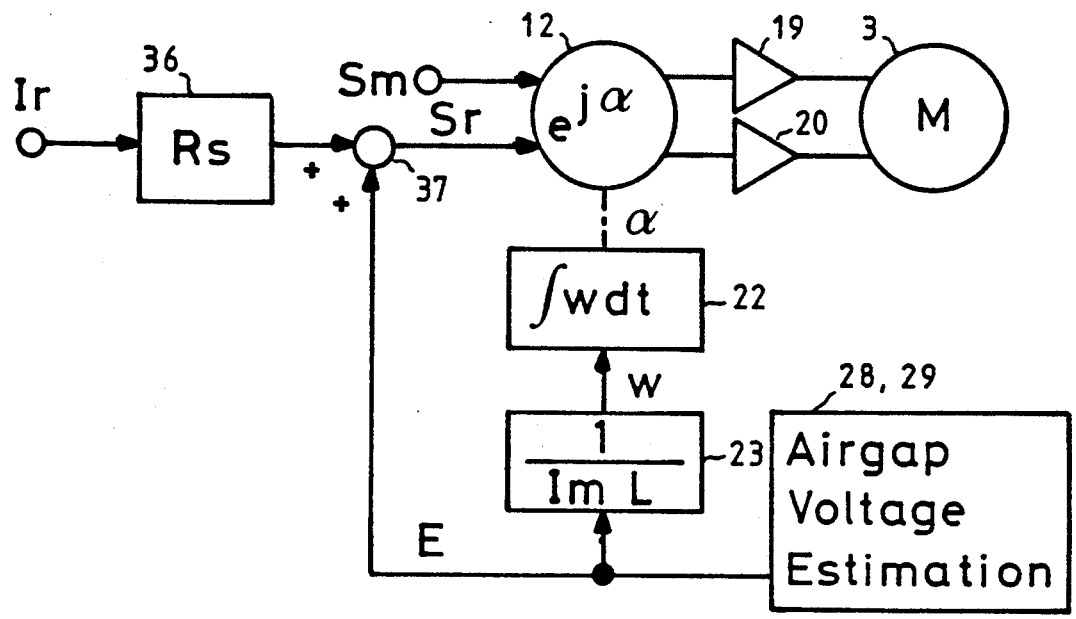
FIGS. 16 and 17 are block diagrams showing another two different versions of the control system according to the invention.

FIG. 16 shows another system according to the present invention which is basically the same system as in FIG. 8. However, an external control signal Ir is used instead of the control signal Sr.

The control system calculates a voltage control signal Sr according to FIG. 4:

$$Sr = Ir\,Rs + E^* \tag{28}$$

by means of a constant multiplying circuit 36 and an adder circuit 37 and the obtained signal Sr is connected to the vector rotator 12.

This converted version makes it possible to control the rotor current by the external control signal Ir, although the motor is voltage controlled and has voltage source frequency inverters. However, the influence of the leakage inductances is not eliminated. It is not a "true" current control system.

The control characteristics are essentially the same as for a current controlled DC motor. The control signal Ir controls the torque.

Figure 17:
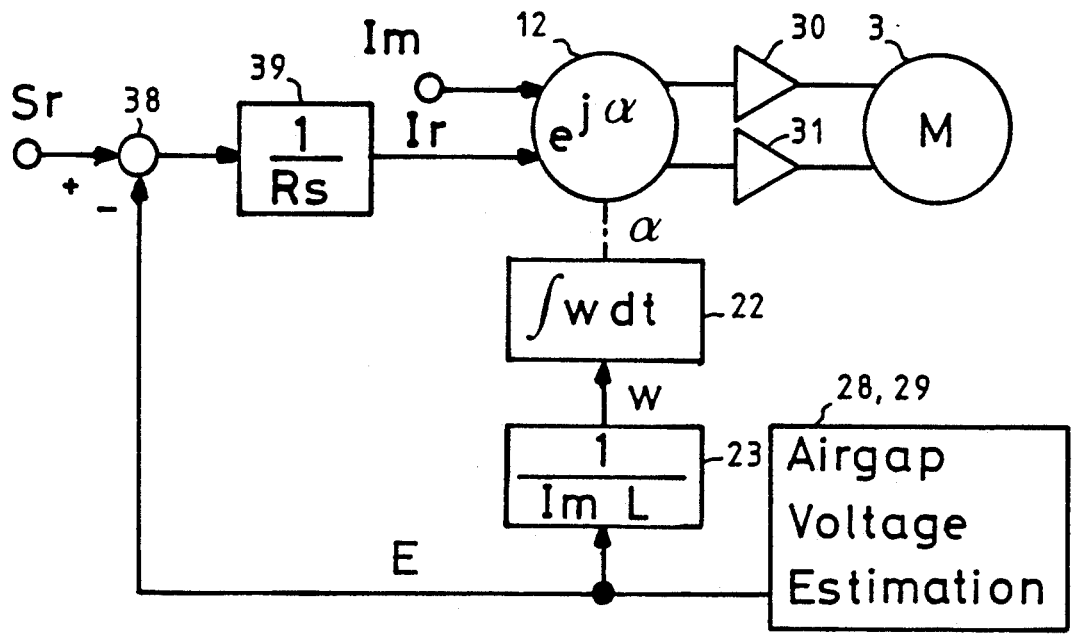

FIG. 17 shows another system according to the present invention which is basically the same system as in FIG. 9. An external control signal Sr is used instead of the control signal Ir.

The control system calculates a current control signal Ir:

$$Ir = (Sr - E^*)/Rs \tag{29}$$

by means of an adder circuit 38 and a constant multiplying circuit 39 and the obtained signal Ir is connected to the vector rotator.

This converted version makes it possible to control the rotor voltage by the external signal Sr, although the motor is current controlled by current source frequency inverters. The influence of the leakage inductances is partly eliminated by the current source frequency inverters.

The control characteristics are the same as for a voltage controlled DC motor. The rotor voltage controls essentially the speed.

Figure 18:
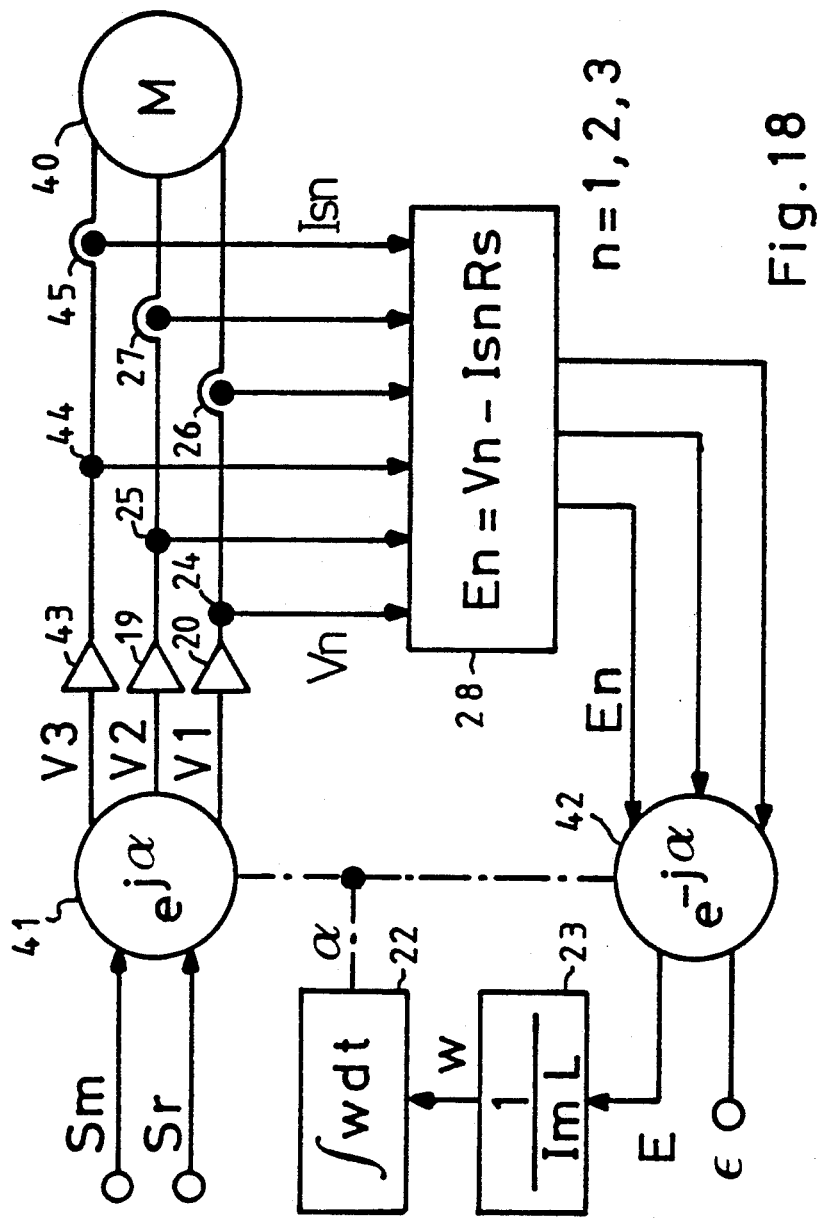
FIG. 18 is a block diagram similar to FIG. 8 including three-phase vector rotators and a threephase motor.
Figure 19:
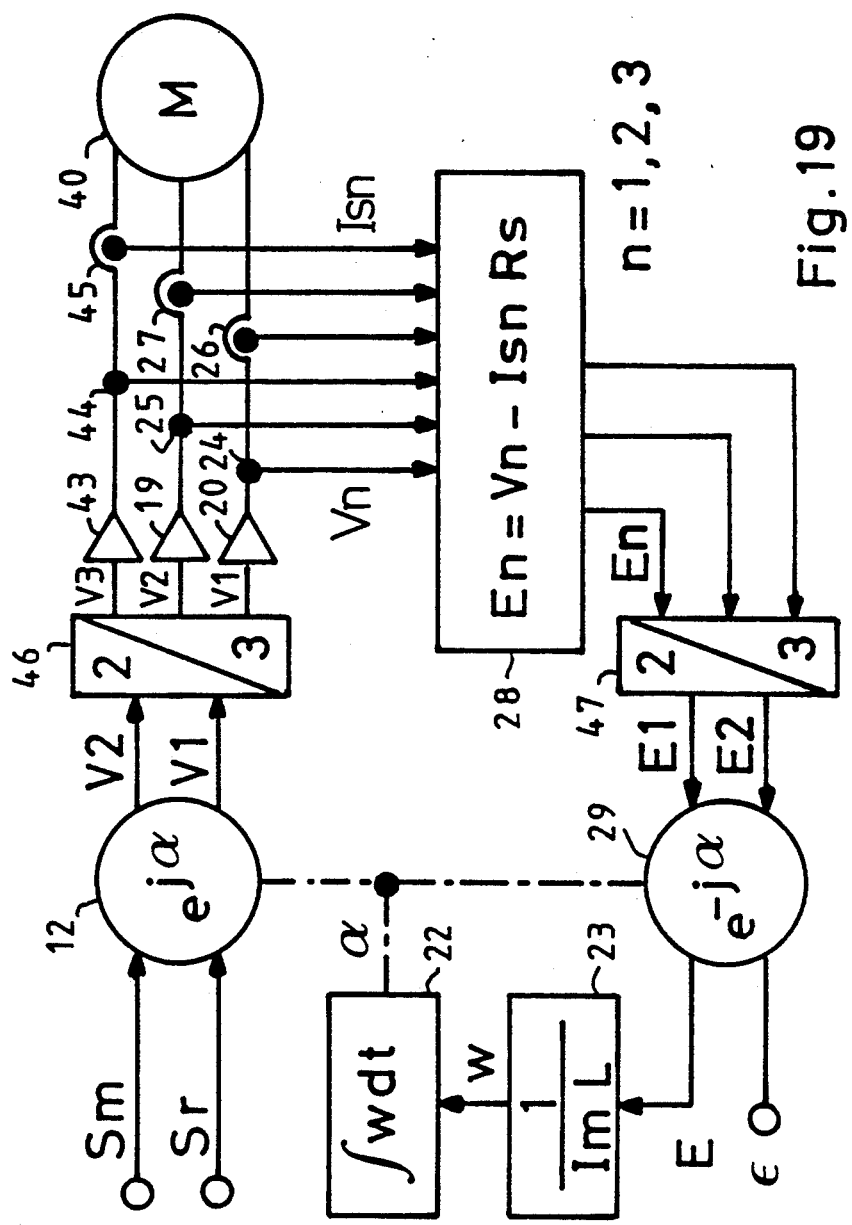
FIG. 19 is a block diagram similar to FIG. 18 but including converters between two and three phases.

FIGS. 18 and 19 show systems with three-phase motors 40. Except for the three phases, the systems are identical with the system in FIG. 8. A similar conversion to three phases (not shown) can be made for the system in FIG. 9.

In FIG. 18 the vector rotator 41 has a three-phase output and the vector counterrotator 42 has a three-phase input.

An extra frequency inverter 43 is needed for the third phase, as well as extra measuring means for voltage 44 and current 45.

Measurements and calculations in block 28 should be made for all phases.

In FIG. 19 there are separate conversion blocks 46 and 47 between two and three phases.

Suitable transformation formulas can be found for example in "Power Electronics and AC Drives", pages 46–48, by B. K. Bose, Prentice Hall.

The control system according to the present invention measures the airgap voltage vector E, which is a two-dimensional quantity, defined for example in polar coordinates by an amplitude and an angle. The system needs only the amplitude of this vector, converted to field coordinates. The system doesn't use the information about the vector angle. This is a redundant information, which can be used for automatic parameter adaptation according to the following description.

The angle of the vector E in the real motor shall be parallel with the "commanded" vector E, which is parallel with the control signal Sr. A parallelity error indicates an error in the system.

The two vector rotators are controlled by the same rotation angle α, although in opposite directions. The effects cancel each other. Thus, by definition the two output signals ($\epsilon$, E) of the counterrotator 29 are parallel with the two control signals (Sm, Sr) to the first vector rotator 12.

Consequently, the measured vector (E1*, E2*), transformed to field coordinates shall be parallel with the E* output. Any angular error in the measured vector will give a contribution on the $\epsilon$ output, which thus indicates an error. Said error signal may be used for parameter adaption of the model values of the motor.

In order to locate and isolate the error it is necessary to make some simplifying assumptions. It is assumed that the vector rotators operate mathematically correct, that the frequency inverters don't distort the signals, and that the measurement of phase voltage and phase current is correct. A system with voltage source frequency inverters is studied. (A similar study can be made for current source frequency inverters.) It is assumed that the different motor phases are identical. Leakage inductances are neglected in this example.

In the complete system, including the control system with vector rotators, the frequency inverters and the real motor, there remain only two components which may have errors, viz the stator resistance Rs and the main inductance L. Errors are defined as the difference between the assumed component values in the system model and the real component values in the motor.

The stator resistance Rs may be adapted at zero speed (or low speed) operation. Assume motor operation with no load and zero speed, for example immediately after power turn-on. The input signal Sr is zero. The frequency w is zero and the airgap voltage E is zero. The rotor current Ir is zero, but the magnetizing current Im shall have its nominal value. This is true DC operation and thus all voltage and current components are parallel with Sm. The circuit for estimation of the airgap voltage calculates the vector (E1*, E2*) according to equations (20) and (21).

This estimated vector shall be zero. If not, an error component will appear on the output $\epsilon$ from the vector rotator. The error depends on a wrong value of Rs in the system model in one or both phases. The signal on the output $\epsilon$ can be used as an error signal (plus or minus), which adjusts Rs up or down until the error signal $\epsilon$ is zero.

Alternatively, an adjustment of the value Rs can be made individually in each phase according to equations (20) and (21), if the calculation and correction is made in block 28, FIGS. 8 and 9. However, in this case the adjustment must be made during DC-conditions, and ideally when the magnetizing current Im has its maximum value in each phase. Thus the vector rotator should be rotated 90° between the two measurements and adjustments (or 120° and 240° for three-phase operation).

This adjustment works correctly for any value of Vn (or Isn) greater than zero. The voltage is used as a "test signal", as in a conventional ohm-meter. The same adjustment method can be used for control systems with voltage source frequency inverters and current source frequency inverters.

The main inductance L can be adjusted at high speed operation. This method can be used only when Rs has been adjusted to a correct value. The main inductance L is assumed to have the same value in all phases.

Assume motor operation during high speed, and thus high modulating frequency w. The magnetizing current Im depends essentially on the main inductance L. An error in the model value of L gives an error in the magnetizing current Im. Since the magnetizing current gives a voltage drop in the stator resistance Rs, a current error will give a voltage drop error in the stator resistance. This error is parallel with the voltage Sm, and will appear in the output $\epsilon$ from the vector rotator. The signal on the output $\epsilon$ can be used as an error signal (plus or minus), which adjusts L down or up until the error signal on $\epsilon$ is zero.

By operating and adjusting the system according to two different parameter adaptation methods during different operating conditions, it is possible to achieve a correct parameter adjustment for the two unknown motor parameters Rs and L. It is also possible to start a new system with an unknown motor and make the initial adjustment automatically.

The two methods can be used alternatively, depending on the motor's actual operation conditions. A small Sr signal indicates that the first method should be used, and a larger Sr signal indicates that the second method should be used. It is also possible to use the two methods simultaneously, in a system where the two methods are added with different weighting factors, depending on the operating conditions.

It should be observed that the inductance L is a stable parameter, and an initial adjustment during the first start of a system may be enough. Then the first method can be used continuously at all speeds, thus compensating for variations in the stator resistance when the motor temperature changes.

An additional method is to have a temperature sensor in the motor stator, and make temperature compensation of Rs based on the measured temperature.

The leakage inductances have been neglected so far. It has been shown that the most important parameter adjustment occurs during DC conditions (the first method), when the leakage inductances have zero impedance, and really are neglectable.

The parameter adjustment is important. The magnetizing current is controlled essentially by the stator resistance at low frequencies, and essentially by the main inductance at high frequencies. A correct adjustment guarantees that the magnetizing current will remain correct during all operating conditions, also during dynamic conditions with quick changes between high and low speed. Thus the quadrature, and consequently the Natural Field Orientation, will remain correct all the time.

It is assumed that the control system operates during almost ideal conditions, with small errors. An error signal on the output $\epsilon$ of the vector rotator indicates that the airgap voltage vector E has a slight error in its angular direction. Of course also the output E* will have an error in such a case, although very small, because the signal E* is proportional to the cosine of the error angle. This error is generally neglectable. It would also be impossible to separate it from the real signal.

Most systems for field oriented control are known to be sensitive for variations in the rotor resistance. It can be concluded from the present description that a control system according to the present invention is inherently insensitive to variations in the rotor resistance. If current source frequency inverters are used the control system will be totally independent of the rotor resistance. If voltage source frequency inverters are used, the rotor resistance will have influence on the rotor current, exactly as in a voltage controlled DC motor, but the measurement of the airgap voltage and consequently the control of the magnetizing current Im and the Natural Field Orientation will not depend on the rotor resistance.

This is an important advantage in comparison with a control system according to the Swedish patent No. 8000118 in which the rotor resistance Rr is included in the calculation formulas.

One approach for parameter adaption has been described above. It is based on redundant measurement information in the control system. It is obvious that other sources of redundant information, for example measurement of the rotor speed, can be used for parameter identification or adjustment.

Also the redundant information in FIGS. 10, 11, 12 and 13 can be used for parameter adaption or for control purposes. For example, it is possible to calculate the counter EMF U* by help of the following equation which is obtained from FIGS. 2 and 4:

$$U^* = Sr^* - Ir^*(Rs + Rr) \qquad (30)$$

This value of U* is proportional to the rotor speed and can be used as a "synthetic" (or estimated) tachometer signal in a speed control loop. However, it is not as accurate as a real tachometer signal.

The current Ir* is proportional to the motor torque, and can be used in a torque control loop, for example together with the systems in FIGS. 10 or 11.

The frequency inverters are assumed to be "ideal" according to the present description (see the description of FIG. 7). It is not necessary for the operating principle to have "ideal" frequency inverters. Also simpler inverters, for example thyristor frequency inverters with a relatively low switching frequency, can be used in a motor control system according to the present invention.

A control system according to the present invention can be designed with any type of electrical circuits, such as analog or digital circuits or any mix of such circuits.

A vector counterrotator is used in the present description for transforming the estimated airgap voltage from stator coordinates to field coordinates. The output E from the vector rotator represents the stationary airgap voltage vector in field coordinates. It is not necessary to use a vector rotator. The absolute value of the vector can be calculated as:

$$|E^*| = \sqrt{(E1^*)^2 + (E2^*)^2} \qquad (31)$$

If the rotation vector $\underline{E}$ has a constant amplitude, this calculated value will be a constant value without ripple, also for low frequencies down to zero frequency. In a three-phase system, an equivalent calculation is:

$$|E^*| = 2/3 \sqrt{(E1^*)^2 + (E2^*)^2 + (E3^*)^2} \qquad (32)$$

Of course it is possible to obtain a value of the airgap voltage also in each single phase, by a rectifier with a filter or a hold-function, but this will not work satisfactorily at very low frequencies, because of the ripple or the long time between the sampling moments. It may be possible to use some kind of "computing RMS converter", or even "thermal RMS converter", or some kind of peak detector.

However, it is also necessary to know the sign (plus or minus) of the value E. Some kind of "phase sensitive rectifier" may be used for this purpose, in addition to or in combination with the above computation formulas, or together with other formulas.

These were only examples. The vector rotator seems to be the best solution. However, it is possible to use any physical and mathematical method for measuring and calculating a value of the airgap voltage E in field coordinates, still within the scope of the invention.

The PCT patent application PCT/SE88/00124 discloses an improvement of the original control system according to Swedish patent No. 8000118. The non-linear magnetization characteristics of the stator and rotor iron can be compensated by a simple addition to the control system. The modulation in vector rotator 12, blocks 13 and 15 of the voltage component Sm is made with a modified sine and cosine function, intended to compensate for the nonlinear voltage drop in stator resistance Rs caused by the nonlinear magnetizing current. This improvement can also be used together with the present control system, for voltage source frequency inverters as well as current source frequency inverters. In the case of current source frequency inverters the magnetizing current Im should be modulated in vector rotator 12, blocks 13 and 15 with a modified sine and cosine function.

In recent years a new control strategy for the AC induction motor has been described, sometimes characterized as "limit cycle control of flux and torque". It is based on the observation that a three-phase frequency inverter system consists of three pairs of semiconductor switches, which can create only six different voltage vectors plus a zero vector. The control system switches between these vectors according to a switching table, in order to create optimal switching. This principle is primarily intended to make efficient use of the inverter and avoid unnecessary switching. An example of the new control strategy is described in "A new Quick-Response and High-Efficiency Control Strategy of an Induction Motor" by Isao Takahashi and Toshihiko Noguchi, IEEE Transactions on Industry Applications, Vol. IA-22, No. 5. September/October 1986.

It would be possible to apply this switch method to a control system according to the present invention. The control system would deliver necessary information to the switching table.

The four systems according to the present invention are based on airgap voltage measurement. Thus the need for a speed sensor on the rotor shaft is eliminated.

The system with current source frequency inverters controls the motor torque, and the system with voltage source frequency inverters controls essentially the motor speed. Depending on the application, there is a need for both types of systems.

Current source frequency inverters eliminate the influence of leakage inductances, and create correct rotor current independent of the rotor resistance. Thus, systems with current source inverters are considered to represent the best version of the present invention.

The control characteristics can be changed and improved by external control loops, for example with tachometer or position feedback loops. This is made according to conventional control theory and is not described here.

As mentioned previously, the airgap voltage can be measured by special measuring windings in the motor. The windings measure the induced voltage in the airgap, caused by the magnetic airgap field. However, there are three diffent magnetic fields in the motor, the stator field, the airgap field and the rotor field. The difference between the fields is due to the stator and rotor leakage inductances.

Of primary interest for the control system according to the present invention is the rotor field, which is equivalent with the airgap field in a motor model with the rotor leakage inductance transformed to the stator side. However, the measuring winding measures the true airgap field. Thus, the measured result must be compensated by a compensation term proportional to the stator current. This is a wellknown compensation method in systems which use measuring windings or magnetic Hall sensors in the airgap of the motor, see for example the mathematical motor model in the paper "Natural Field Orientation, a New Voltage Control System for the AC Induction Motor", Ragnar Jönsson, Conference proceedings of PCIM Intelligent Motion Conference, October 1989, Long Beach, Calif., USA.

Hereinabove has been described four versions of the new control system according to the present invention according to FIGS. 8, 9, 16 and 17. They create a large spectrum of control possibilities in addition to that described in Swedish patent No. 8000118 for the AC induction motor all based on Natural Field Orientation.

I claim:

1. A control system for an AC induction motor (M) for field oriented control, comprising a stator (3), a rotor (4), at least two stator windings (1, 2) and rotor windings (5, 6), said control system comprising control signals (Sm, Sr), a first vector rotator (12) for rotating said control signals with a first angle ($\alpha$) for conversion from field coordinates to stator coordinates for providing output signals (V1, V2) connected to frequency inverters (19, 20) for providing drive signals to each stator winding (1, 2) of the motor, said first angle ($\alpha$) being obtained by integrating a rotation frequency (w) by means of an integrating means (22), said rotation frequency (w) being controlled essentially for maintaining a magnetizing current (Im) of each stator winding (1, 2) constant, characterized by a means (24, 25, 26, 27) for measuring at least one of voltages of said drive signals, currents of said drive signals, and an airgap voltage (E);

at least a second vector rotator (29, 32, 33) for counterrotating said measured voltages, currents, and airgap voltage (E) with a second angle ($-\alpha$) which is the inverse of said first angle ($\alpha$) for conversion from stator coordinates to field coordinates, a means for determining an estimated air-gap voltage (E*) on the basis of said counterrotated measured voltages, currents, and airgap voltage (E);

a means (23) for determining said rotation frequency (w) on the basis of said estimated air-gap voltage (E*) essentially for maintaining the amplitude of said magnetizing current (Im) of each stator winding constant.

2. A control system according to claim 1, characterized by a means for measuring both said voltages and said currents of said drive signals;

a calculation means for calculating air-gap voltages (E1*,E2* . . .) for each stator winding according to the formulas:

$$E1^* = V1^* - Is1^* Rs$$

$$E2^* = V2^* - Is2^* Rs \ldots$$

said second vector rotator counterrotating said airgap voltages (E1*,E2* . . . ) for providing an output control signal (E*) which represents the airgap voltage in field coordinates said control signal (E*) controlling said rotation frequency (w) and where E1* = the estimated airgap voltage for the first stator winding E2* = the estimated airgap voltage for the second stator winding V1* = the measured stator drive voltage of the first stator winding V2* = the measured stator drive voltage of the second stator winding Is1* = the measured stator drive current of the first stator winding Is2* = the measured stator drive current of the second stator winding Rs = the nominal stator resistance for each winding.

3. A control system according to claim 1, characterized by a means for measuring both said voltages and said currents of said drive signals;

a calculation means for calculating air-gap voltages (E1*,E2* . . .) for each stator winding according to the formulas:

$$E1^* = V1^* - Is1^*(Rs+sl)$$

$$E2^* = V2^* - Is2^*(Rs+sl) \ldots$$

said second vector rotator counterrotating said airgap voltages (E1*,E2* ...) for providing an output control signal (E*) which represents the airgap voltage in field coordinates said control signal (E*) controlling said rotation frequency (w) and where E1* = the estimated airgap voltage for the first stator winding E2* = the estimated airgap voltage for the second stator winding V1* = the measured stator drive voltage of the first stator winding V2* = the measured stator drive voltage of the second stator winding Is1* = the measured stator drive current of the first stator winding Is2* = the measured stator drive current of the second stator winding Rs = the nominal stator resistance for each winding s = the Laplace-operator l = the total nominal leakage inductance for each stator winding, with the rotor leakage inductance transformed to the stator side and added to the stator leakage inductance.

4. A control system according to claim 2, characterized by a means for calculating said rotation frequency (w) according to the formula:

$$w = E^*/lmL$$

and a means for calculating the first angle (α) as the time integral of said rotation frequency (w) according to the formula:

$$\alpha = \int w \, dt$$

where

L = the main inductance of each stator winding, defined for a motor model with the total leakage inductance on the stator side lm = the desired magnetizing current.

5. A control system according to claim 4, characterized in that said control signals to said control system are two voltage control signals (Sm, Sr), said first control signal (Sm) essentially being generated according to the formula Sm = Im Rs, said first control signal (Sm) being delayed 90° in relation to said second control signal (Sr) by said first vector rotator (12), said frequency inverters (19, 20) being of a voltage source type.

6. A control system according to claim 4, characterized by said control signals to said control system being a single current control signal (Ir) representing the desired rotor current; a means (36) for multiplying said current control signal (Ir) with a constant (Rs) in a multiplier circuit and a means (37) for adding the measured output control signal (E*) for providing a second control signal (Sr) to the first vector rotator (12); a first control signal (Sm) being provided to the vector rotator, which is delayed 90° in relation to said second control signal (Sr) by said first vector rotator (12), said first control signal (Sm) essentially being generated according to the formula Sm = Im Rs; said frequency inverters (19, 20) being of a voltage source type.

7. A method for controlling an AC induction motor (M) for field oriented control, comprising a stator (3), a rotor (4), at least two stator windings (1, 2) and rotor windings (5, 6), by a control system comprising control signals (Sm, Sr), a first vector rotator (12) for rotating said control signals with a first angle (α) for conversion from field coordinates to stator coordinates for providing output signals (V1, V2) connected to frequency inverters (19, 20) for providing drive signals to each stator winding (1, 2) of the motor, said first angle (α) being obtained by integrating a rotation frequency (w) by means of an integrating means (22), said rotation frequency (w) being controlled essentially for maintaining a magnetizing current (Im) of each stator winding (1, 2) constant, characterized by measuring at least one of voltages of said drive signals, currents of said drive signals, and an airgap voltage (E);

counterrotating said measured voltages, currents and airgap voltage (E) by at least a second vector rotator (29, 32, 33) with a second angle (−α) which is the inverse of said first angle (α) for conversion from stator coordinates to field coordinates, a means for determining an estimated air-gap voltage (E*) on the basis of said counterrotated measured voltages, currents, and airgap voltage (E);

determining said rotation frequency (w) on the basis of said estimated air-gap voltage (E*) essentially for maintaining the amplitude of said magnetizing currents (Im) of each stator winding constant.

8. A method according to claim 7, characterized by measuring both said voltages and said currents of said drive signals;

calculating air-gap voltages (E1*, E2* ... ) for each stator winding according to the formulas:

$$E1^* = V1^* - Is1^* Rs$$

$$E2^* = V2^* - Is2^* Rs \ldots$$

counterrotating said air-gap voltages (E1*,E2* ... ) by said second vector rotator for providing an output control signal (E*) which represents the airgap voltage in field coordinates calculating said rotation frequency (w) according to the formula:

$$w = E^*/ImL$$

calculating the first angle (α) as the time integral of said rotation frequency (w) according to the formula:

$$\alpha = \int w \, dt$$

and where

E1* = the estimated airgap voltage for the first stator winding

E2* = the estimated airgap voltage for the second stator winding

V1* = the measured stator drive voltage of the first stator winding

V2* = the measured stator drive voltage of the second stator winding

Is1* = the measured stator drive current of the first stator winding

Is2* = the measured stator drive current of the second stator winding

Rs = the nominal stator resistance for each winding

L = the main inductance of each stator winding, defined for a motor model with the total leakage inductance on the stator side Im = the desired magnetizing current.

9. A method according to claim 7, characterized by measuring both said voltages and said currents of said drive signals:

calculating air-gap voltages (E1*, E2* ...) for each stator winding according to the formulas:

$$E1^* = V1^* - Is1^*(Rs+sl)$$

$$E2^* = V2^* - Is2^*(Rs+sl)\ldots$$

said second vector rotator counterrotating said air-gap voltages (E1*, E2* ...) for providing an output control signal (E*) which represents the airgap voltage in field coordinates calculating said rotation frequency (w) according to the formula:

$$w = E^*/Im\ L$$

calculating the first angle ($\alpha$) as the time integral of said rotation frequency (w) according to the formula:

$$\alpha = \int w\,dt$$

and where

E1* = the estimated airgap voltage for the first stator winding

E2* = the estimated airgap voltage for the second stator winding

V1* = the measured stator drive voltage of the first stator winding

V2* = the measured stator drive voltage of the second stator winding

Is1* = the measured stator drive current of the first stator winding

Is2* = the measured stator drive current of the second stator winding

Rs = the nominal stator resistance for each winding s = the Laplace-operator l = the total nominal leakage inductance for each stator winding, with the rotor leakage inductance transformed to the stator side and added to the stator leakage inductance L = the main inductance of each stator winding, defined for a motor model with the total leakage inductance on the stator side Im = the desired magnetizing current.

10. A method according to claim 8, characterized by said second vector rotator (29) counterrotating said calculated air-gap voltages (E1*, E2* ...) for providing an output control signal (E*) which represents the airgap voltage in field coordinates and an error signal ($\epsilon$) in field coordinates, and one of:

operating the control system and the motor with low or zero speed and adjusting a model value of the stator resistance (Rs) until the error signal is as small as possible; and operating the control system and the motor with a high speed and adjusting a model value of the main inductance (L) until the error signal is as small as possible.

11. A control system according to claim 3, characterized by a means (23) for calculating said rotation frequency (w) according to the formula:

$$w = E^*/(Im\ L)$$

and a means (22) for calculating the first angle ($\alpha$) as the time integral of said rotation frequency (w) according to the formula:

$$\alpha = \int w\,dt$$

where

L = the main inductance of each stator winding, defined for a motor model with the total leakage inductance on the stator side Im = the desired magnetizing current.

12. A control system according to claim 11, characterized in that said control signals to said control system are two voltage control signals (Sm, Sr), said first control signal (Sm) essentially being generated according to the formula Sm = Im Rs, said first control signal (Sm) being delayed 90° in relation to said second control signal (Sr) by said first vector rotator (12), said frequency inverters (19, 20) being of a voltage source type.

13. A control system according to claim 4, characterized in that said control signals to said control system are two current control signals (Im, Ir), the first control signal being essentially the desired magnetizing current (Im), said first control signal (Im) being delayed 90° in relation to said second control signal (Ir) by said first vector rotator (12), said frequency inverters (30, 31) being of a current source type.

14. A control system according to claim 11, characterized in that said control signals to said control system are two current control signals (Im, Ir), the first control signal being essentially the desired magnetizing current (Im), said first control signal (Im) being delayed 90° in relation to said second control signal (Ir) by said first vector rotator (12), said frequency inverters (30, 31) being of a current source type.

15. A control system according to claim 11 characterized by said control signals to said control system being a single current control signal (Ir) representing the desired rotor current; a means (36) for multiplying said current control signal (Ir) with a constant (Rs) in a multiplier circuit and a means (37) for adding the measured output control signal (E*) for providing a second control signal (Sr) to the first vector rotator (12); a first control signal (Sm) being provided to the vector rotator, which is delayed 90° in relation to said second control signal (Sr) by said first vector rotator (12), said first control signal (Sm) essentially being generated according to the formula Sm = Im Rs; said frequency inverters (19, 20) being of a voltage source type.

16. A control system according to claim 4, characterized by said control signal to said control system being a single voltage control signal (Sr), a means (38) for subtracting the measured output control signal (E*) from said control signal (Sr) and multiplying (39) the result (Sr−E*) with the inverse of the stator resistance (1/Rs) for providing a second control signal (Ir) to the first vector rotator (12); a first control signal (Im) being provided to the first vector rotator (12) which is delayed 90° in relation to said second control signal (Ir) by said first vector rotator (12), said first control signal being essentially the desired magnetizing current (Im); said frequency inverters (30, 31) being of a current source type.

17. A control system according to claim 11, characterized by said control signal to said control system being a single voltage control signal (Sr), a means (38) for subtracting the measured output control signal (E*) from said control signal (Sr) and multiplying (39) the result (Sr−E*) with the inverse of the stator resistance (1/Rs) for providing a second control signal (Ir) to the first vector rotator (12); a first control signal (Im) being provided to the first vector rotator (12) which is delayed 90° in relation to said second control signal (Ir) by said first vector rotator (12), said first control signal being essentially the desired magnetizing current (Im); said frequency inverters (30, 31) being of a current source type.

18. A method according to claim 9, characterized by said second vector rotator (29) counterrotating said calculated air-gap voltages (E1*, E2* . . . ) for providing an output control signal (E*) which represents the airgap voltage in field coordinates and an error signal (ε) in field coordinates, and one of:

operating the control system and the motor with low or zero speed and adjusting a model value of the stator resistance (Rs) until the error signal is as small as possible; and operating the control system and the motor with a high speed and adjusting a model value of the main inductance (L) until the error signal is as small as possible.

19. A control system according to claim 1, wherein said means for measuring is a measuring winding for measuring an airgap voltage (E).

20. A method according to claim 7, wherein said measuring is measuring of an airgap voltage (E).

* * * * *